(12) United States Patent
Hoshi et al.

(10) Patent No.: US 7,323,512 B2
(45) Date of Patent: *Jan. 29, 2008

(54) STYRENE COPOLYMER COMPOSITION

(75) Inventors: Susumu Hoshi, Yokohama (JP); Nobuaki Kubo, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/180,524

(22) Filed: Jun. 27, 2002

(65) Prior Publication Data

US 2003/0166774 A1 Sep. 4, 2003

Related U.S. Application Data

(63) Continuation-in-part of application No. 10/069,764, filed as application No. PCT/JP00/04372 on Jun. 30, 2000, now abandoned.

(51) Int. Cl.
*C08L 53/00* (2006.01)

(52) U.S. Cl. .............................. 525/89; 525/94; 525/98

(58) Field of Classification Search .................. 525/89, 525/94, 98
See application file for complete search history.

(56) References Cited

U.S. PATENT DOCUMENTS

| | | | |
|---|---|---|---|
| 6,235,847 B1 * | 5/2001 | Hoshi et al. | 525/314 |
| 6,660,790 B1 * | 12/2003 | Hoshi et al. | 524/291 |
| 6,844,383 B2 * | 1/2005 | Hoshi et al. | 524/291 |
| 6,939,906 B2 * | 9/2005 | Hoshi et al. | 524/291 |
| 2003/0088004 A1 * | 5/2003 | Hoshi et al. | 524/287 |
| 2005/0222331 A1 * | 10/2005 | Hoshi et al. | 525/88 |

FOREIGN PATENT DOCUMENTS

| | | | |
|---|---|---|---|
| EP | 1266935 | * | 12/2002 |
| JP | 59-221348 | | 12/1984 |
| JP | 61-25819 | | 2/1986 |
| JP | 5-104630 | | 4/1993 |
| JP | 6-220278 | | 8/1994 |
| JP | 7-179696 | | 7/1995 |
| JP | 7-216187 | | 8/1995 |
| JP | 9-151285 | | 6/1997 |
| JP | 2001-2871 | * | 1/2001 |
| WO | WO 0008079 | * | 2/2000 |
| WO | WO 01/90207 | * | 11/2001 |

OTHER PUBLICATIONS

Caplus AN 2001:19048, abstract od JP 2001-2871, Jan. 2001.*

* cited by examiner

*Primary Examiner*—Jeffrey Mullis
(74) *Attorney, Agent, or Firm*—Birch, Stewart, Kolasch & Birch, LLP

(57) ABSTRACT

Disclosed is a styrene copolymer composition having: (I) a styrene/n-butyl acrylate copolymer having styrene monomer units and n-butyl acrylate monomer units in a ratio from 80/20 to 89/11, and (II) a block copolymer having a block configuration having (A) at least two polymer blocks each having mainly vinyl aromatic hydrocarbon monomer units and (B) at least one vinyl aromatic hydrocarbon/conjugated diene copolymer block, wherein the block copolymer (II) has vinyl aromatic hydrocarbon monomer units and conjugated diene monomer units in a ratio from 65/35 to 90/10 or from 75/25 to 85/15, and wherein the polymer blocks (A) in the block copolymer (II) have a maximum weight polymer block and a minimum weight polymer block, the weight ratio of the maximum weight polymer block to the minimum weight polymer block being in the range from 1.2 to 4.5 or from 1.0 to less than 1.2.

16 Claims, 1 Drawing Sheet

STYRENE COPOLYMER COMPOSITION

This application is a continuation-in-part of U.S. patent application Ser. No. 10/069,764, filed on Feb. 28, 2002, now abandoned, which is a national phase PCT application of Application No. PCT/JP00/04372, filed on Jun. 30, 2000.

BACKGROUND OF THE INVENTION

1. Field of the Invention

The present invention relates to a styrene copolymer composition comprising a styrene/n-butyl acrylate copolymer (I) and a block copolymer (II) comprising vinyl aromatic hydrocarbon monomer units and conjugated diene monomer units. More particularly, the present invention is concerned with a styrene copolymer composition comprising a styrene/n-butyl acrylate copolymer (I) comprising styrene monomer units and n-butyl acrylate monomer units in a specific ratio, and a block copolymer (II) having a block configuration comprising at least two polymer blocks (A) each comprised mainly of vinyl aromatic hydrocarbon monomer units and at least one vinyl aromatic hydrocarbon/ conjugated diene copolymer block (B), the block copolymer (II) comprising vinyl aromatic hydrocarbon monomer units and conjugated diene monomer units in a specific ratio, wherein the vinyl aromatic hydrocarbon monomer unit moiety of the block copolymer (II) has a specific ratio of the vinyl aromatic hydrocarbon monomer units contained in short segment(s) consisting of 1 to 3 vinyl aromatic hydrocarbon monomer units, wherein the polymer blocks (A) contain a specific amount of a maximum peak molecular weight polymer block exhibiting a maximum peak molecular weight in a gel permeation chromatogram of the polymer blocks (A) and having at least one peak molecular weight in a specific molecular weight range, wherein the polymer blocks (A) have a maximum weight polymer block and a minimum weight polymer block, wherein the weight ratio of the maximum weight polymer block to the minimum weight polymer block is relatively large, and wherein the weight ratio of the styrene/n-butyl acrylate copolymer (I) to the block copolymer (II) is within a specific range. The present invention is also concerned with a styrene copolymer composition comprising a styrene/n-butyl-acrylate copolymer (I) comprising styrene monomer units and n-butyl acrylate monomer units in a specific ratio, and a block copolymer (II) having a block configuration comprising at least two polymer blocks (A) each comprised mainly of vinyl aromatic hydrocarbon monomer units and at least one vinyl aromatic hydrocarbon/conjugated diene copolymer block (B), the block copolymer (II) comprising vinyl aromatic hydrocarbon monomer units and conjugated diene monomer units, wherein the vinyl aromatic hydrocarbon monomer unit moiety of the block copolymer (II) has a specific ratio of the vinyl aromatic hydrocarbon monomer units contained in short segment(s) consisting of 1 to 3 vinyl aromatic hydrocarbon monomer units, wherein the polymer blocks (A) contain a specific amount of a peak molecular weight-having polymer block exhibiting, in a gel permeation chromatogram of the polymer blocks (A), at least one peak molecular weight in a specific molecular weight range, wherein the polymer blocks (A) have a maximum weight polymer block and a minimum weight polymer block, wherein the weight ratio of the maximum weight polymer block to the minimum weight polymer block is relatively small, and wherein the weight ratio of the styrene/n-butyl acrylate copolymer (I) to the block copolymer (II) is within a specific range. (Hereinafter, the block copolymer (II) comprising at least two polymer blocks (A) having a relatively large weight ratio of the maximum weight polymer block to the minimum weight polymer block is frequently referred to as an "asymmetric block copolymer (II)" and the block copolymer (II) comprising at least two polymer blocks (A) having a relatively small weight ratio of the maximum weight polymer block to the minimum weight polymer block is frequently referred to as an "symmetric block copolymer (II)").

A shaped article obtained from the styrene copolymer composition of the present invention not only exhibits high modulus in tension, high elongation at break, excellent transparency, low natural shrinkage factor (i.e., low shrinkability at ambient temperature) and high resistance to fusion bonding in hot water (for example, low degree of fusion bonding in hot water having a temperature of 85° C.) but also is free from marked occurrence of fish eyes (hereinafter, a "fish eye" is frequently referred to simply as an "FE"). Further, when the styrene copolymer composition of the present invention contains the above-mentioned asymmetric block copolymer (II), a shaped article obtained therefrom has also excellent surface impact strength. On the other hand, when the styrene copolymer composition of the present invention contains the above-mentioned symmetric block copolymer (II), a shaped article obtained therefrom has also advantageously low anisotropy. Further, by incorporating a specific additive into the styrene copolymer composition of the present invention, the occurrence of FE's in a shaped article (such as a sheet or a film) obtained therefrom can be more effectively suppressed.

In addition, a heat shrinkable film obtained from the styrene copolymer composition of the present invention not only is free from marked occurrence of FE's but also exhibits excellent heat shrinkability at relatively low heating temperatures.

2. Prior Art

A block copolymer comprising vinyl aromatic hydrocarbon monomer units and conjugated diene monomer units wherein the vinyl aromatic hydrocarbon monomer unit content is relatively high, has various excellent characteristics, such as transparency and impact resistance, so that the block copolymer has been used for producing injection-molded products, extrusion-molded products (such as a sheet and a film) and the like. Further, a polymer composition comprising the above-mentioned block copolymer and a vinyl aromatic hydrocarbon/aliphatic unsaturated carboxylic acid derivative copolymer has excellent transparency, mechanical properties and shrinkability, so that the composition has been used for producing a sheet, a film and the like.

Conventionally, with respect to the above-mentioned polymer composition, and a sheet or film obtained therefrom, a number of proposals have been made in patent documents. For example, as a composition having not only high tensile strength, modulus and impact strength, but also excellent optical characteristics, elongation property and cracking resistance and the like, Unexamined Japanese Patent Application Laid-Open Specification No. 59-221348 discloses a polymer composition comprising a vinyl aromatic hydrocarbon/aliphatic unsaturated carboxylic acid derivative copolymer and a copolymer comprising at least one vinyl aromatic hydrocarbon polymer block and at least one polymer block composed mainly of a conjugated diene, wherein the vinyl aromatic hydrocarbon/aliphatic unsaturated carboxylic acid derivative copolymer has an aliphatic unsaturated carboxylic acid derivative content of from 5 to 80% by weight and has a Vicat softening point of 90° C. or less. As a heat shrinkable film having excellent heat shrinkability at relatively low heating temperatures (for example, at least 20% in terms of a shrinkage factor measured at 80° C.), optical characteristics, cracking resistance, dimensional stability and the like, Unexamined Japanese Patent Application Laid-Open Specification No. 61-25819 discloses a film obtained by stretching a film of a polymer composition comprising a vinyl aromatic hydrocarbon/aliphatic unsaturated carboxylic acid derivative copolymer and a copolymer comprising at least one vinyl aromatic hydrocarbon polymer block and a polymer block composed mainly of a conjugated diene derivative, wherein the vinyl aromatic hydrocarbon/ aliphatic unsaturated carboxylic acid derivative copolymer has a vinyl aromatic hydrocarbon content of from 20 to 95% by weight and has a Vicat softening point of 90° C. or less. Further, as a transparent, heat shrinkable film having excellent resistance to deterioration with time and impact resistance, Unexamined Japanese Patent Application Laid-Open Specification No. 5-104630 discloses a rigid, heat shrinkable film of a polymer composition comprising a vinyl aromatic hydrocarbon/aliphatic unsaturated carboxylic acid derivative copolymer and a copolymer comprising at least one vinyl aromatic hydrocarbon polymer block and at least one polymer block composed mainly of a conjugated diene derivative, wherein the vinyl aromatic hydrocarbon/aliphatic unsaturated carboxylic acid derivative copolymer has a Vicat softening point of 105° C. or less. This heat shrinkable film exhibits a heat shrinkability in a specific range, as measured in a specific direction of the film. Further, as a polymer composition having excellent transparency, stiffness, and surface impact resistance at low temperatures, Unexamined Japanese Patent Application Laid-Open Specification No. 6-220278 discloses a polymer composition comprising a block copolymer comprising a vinyl aromatic hydrocarbon and a conjugated diene and a vinyl aromatic hydrocarbon/(meth)acrylic ester copolymer resin, wherein the block copolymer has a specific block configuration and a specific molecular weight distribution. Moreover, as a resin composition having excellent transparency and impact resistance, Unexamined Japanese Patent Application Laid-Open Specification No. 7-216187 discloses a transparent resin composition having high strength, which comprises a block copolymer and a vinyl aromatic hydrocarbon/(meth) acrylic ester copolymer, wherein the block copolymer comprises two vinyl aromatic hydrocarbon polymer blocks and two vinyl aromatic hydrocarbon/conjugated diene copolymer blocks.

However, each of the conventional polymer compositions described in the above-mentioned patent documents, each of which comprises a block copolymer comprising vinyl aromatic hydrocarbon monomer units and conjugated diene monomer units and a vinyl aromatic hydrocarbon/aliphatic unsaturated carboxylic acid derivative copolymer, has a problem in that, when the conventional composition is used for producing a relatively thin sheet or film, it is impossible to obtain a sheet or film which not only has high modulus-in-tension, high elongation at break, high surface impact strength, excellent transparency, low natural shrinkage factor and high resistance to fusion bonding in hot water, but also is free from marked occurrence of FE's. In addition, the above-mentioned patent documents do not have any descriptions about how to solve the problem.

SUMMARY OF THE INVENTION

In this situation, the present inventors have made extensive and intensive studies with a view toward solving the above-mentioned problem accompanying the prior art. As a result, it has unexpectedly been found that an excellent shaped article (such as a sheet or a film) which not only has high modulus-in-tension, high elongation at break, high surface impact strength, excellent transparency, low natural shrinkage factor and high resistance to fusion bonding in hot water, but also is free from marked occurrence of FE's, can be produced by using a styrene copolymer composition comprising a styrene/n-butyl acrylate copolymer (I) comprising styrene monomer units and n-butyl acrylate monomer units in a specific ratio, and a block copolymer (II) having a block configuration comprising at least two polymer blocks (A) each comprised mainly of vinyl aromatic hydrocarbon monomer units and at least one vinyl aromatic hydrocarbon/conjugated diene copolymer block (B), the block copolymer (II) comprising vinyl aromatic hydrocarbon monomer units and conjugated diene monomer units in a specific ratio, wherein the vinyl aromatic hydrocarbon monomer unit moiety of the block copolymer (II) has a specific ratio of the vinyl aromatic hydrocarbon monomer units contained in short segment(s) consisting of 1 to 3 vinyl aromatic hydrocarbon monomer units, wherein the polymer blocks (A) contain a specific amount of a maximum peak molecular weight polymer block exhibiting a maximum peak molecular weight in a gel permeation chromatogram of the polymer blocks (A) and having at least one peak molecular weight in a specific molecular weight range, wherein the polymer blocks (A) have a maximum weight polymer block and a minimum weight polymer block, wherein the weight ratio of the maximum weight polymer block to the minimum weight polymer block is relatively large (1.2 to 4.5), and wherein the weight ratio of the styrene/n-butyl acrylate copolymer (I) to the block copolymer (II) is within a specific range. Further, the present inventors have also found that an excellent shaped article (such as a sheet or a film) which not only has high modulus-in-tension, high elongation at break, small anisotropy, excellent transparency, low natural shrinkage factor and high resistance to fusion bonding in hot water, but also is free from marked occurrence of FE's, can be produced by using a styrene copolymer composition comprising a styrene/n-butyl acrylate copolymer (I) comprising styrene monomer units and n-butyl acrylate monomer units in a specific ratio, and a block copolymer (II) having a block configuration comprising at least two polymer blocks (A) each comprised mainly of vinyl aromatic hydrocarbon monomer units and at least one vinyl aromatic hydrocarbon/ conjugated diene copolymer block (B), the block copolymer (II) comprising vinyl aromatic hydrocarbon monomer units and conjugated diene monomer units, wherein the vinyl aromatic hydrocarbon monomer unit moiety of the block copolymer (II) has a specific ratio of the vinyl aromatic hydrocarbon monomer units contained in short segment(s) consisting of 1 to 3 vinyl aromatic hydrocarbon monomer units, wherein the polymer blocks (A) contain a specific amount of a peak molecular weight-having polymer block exhibiting, in a gel permeation chromatogram of the polymer blocks (A), at least one peak molecular weight in a specific molecular weight range, wherein the polymer blocks (A) have a maximum weight polymer block and a minimum weight polymer block, wherein the weight ratio of the maximum weight polymer block to the minimum weight polymer block is relatively small (1.0 to less than 1.2), and wherein the weight ratio of the styrene/n-butyl acrylate copolymer (I) to the block copolymer (II) is within a specific range. Based on these findings, the present invention has been completed.

Accordingly, it is a primary object of the present invention to provide a styrene copolymer composition which can be advantageously used for producing an excellent shaped article (such as a sheet or a film) which has advantages that the shaped article not only has high modulus-in-tension, high elongation at break, excellent transparency, low natural shrinkage factor and high resistance to fusion bonding in hot water, but also is free from marked occurrence of FE's.

It is another object of the present invention to provide a styrene copolymer composition which can be advantageously used for producing an excellent shaped article which has a slightly large anisotropy, but has high surface impact strength as well as the above-mentioned advantages.

It is still another object of the present invention to provide a styrene copolymer composition which can be advantageously used for producing an excellent shaped article which has small anisotropy as well as the above-mentioned advantages.

The foregoing and other objects, features and advantages of the present invention will be apparent from the following detailed description and appended claims taken in connection with the accompanying drawing.

BRIEF DESCRIPTION OF THE DRAWING

In FIG. 1, a curve drawn by solid line shows the lower limit of the preferred range of the melt viscosity, wherein the lower limit is defined by the following formula:

Figure 1:
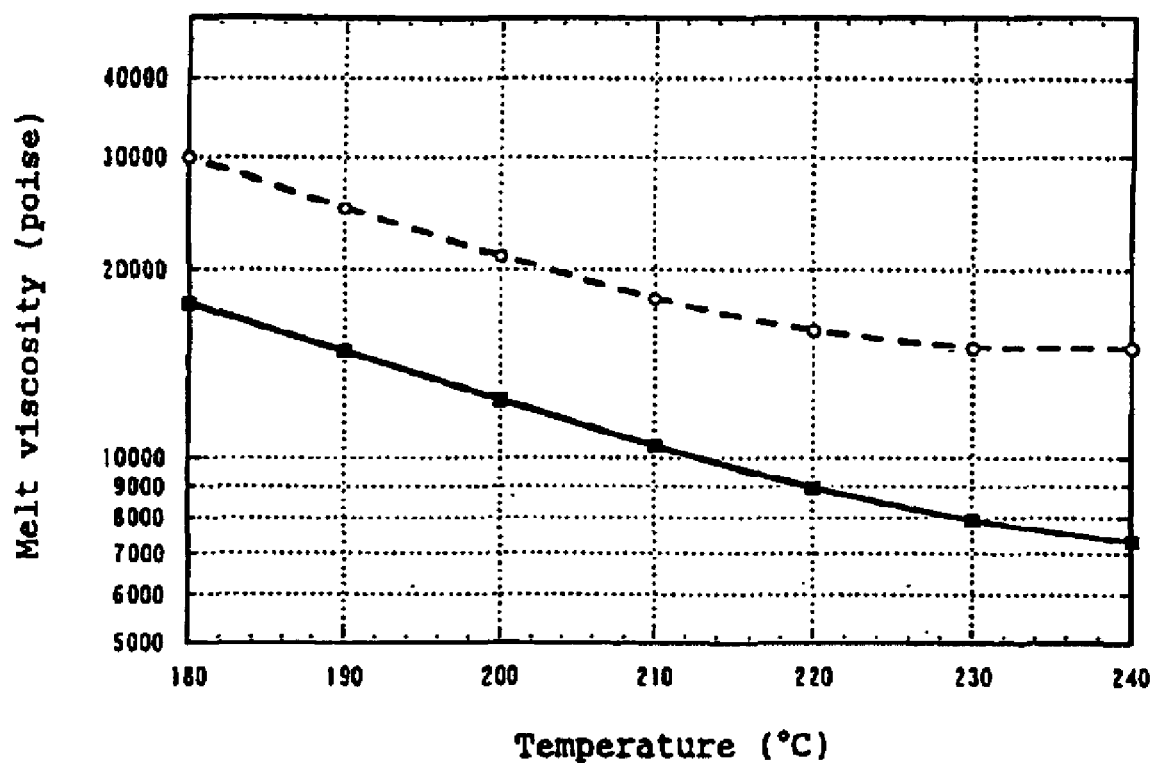
FIG. 1 shows a graph for explaining a preferred range of the melt viscosity of the styrene/n-butyl acrylate copolymer (I) used in the present invention, as measured at a temperature in the range of from 180 to 240° C.

Lower limit of the melt viscosity=$1.46 \times 10^5 - 1119.2 \times T + 2.256 \times T^2$ wherein T represents the measuring temperature (° C.) for the melt viscosity, and a curve drawn by broken line shows the upper limit of the preferred range of the melt viscosity, wherein the upper limit is defined by the following formula:

Upper limit of the melt viscosity=$2.91 \times 10^5 - 2350 \times T + 5 \times T^2$ wherein T represents the measuring temperature (° C.) for the melt viscosity.

DETAILED DESCRIPTION OF THE INVENTION

In one aspect of the present invention, there is provided a styrene copolymer composition comprising:

(I) a styrene/n-butyl acrylate copolymer comprising 80 to 89% by weight of styrene monomer units and 20 to 11% by weight of n-butyl acrylate monomer units; and (II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block, the block copolymer (II) comprising 65 to 90% by weight of vinyl aromatic hydrocarbon monomer units and 35 to 10% by weight of conjugated diene monomer units, wherein the vinyl aromatic hydrocarbon monomer unit moiety of the block copolymer (II) has a short segment ratio of from 1 to 25% by weight, wherein the short segment ratio is defined as the weight percentage, based on the total weight of vinyl aromatic hydrocarbon monomer units contained in the block copolymer (II), of the vinyl aromatic hydrocarbon monomer units contained in at least one short segment consisting of 1 to 3 vinyl aromatic hydrocarbon monomer units, wherein the at least two polymer blocks (A) contain a maximum peak molecular weight polymer block exhibiting a maximum peak molecular weight in a gel permeation chromatogram of the at least two polymer blocks (A) and having at least one peak molecular weight in the range of from 30,000 to 150,000, and the content of the maximum peak molecular weight polymer block in the block copolymer (II) is from 20 to 50% by weight, wherein the at least two polymer blocks (A) have a maximum weight polymer block and a minimum weight polymer block, wherein the weight ratio of the maximum weight polymer block to the minimum weight polymer block is from 1.2 to 4.5, and wherein the weight ratio of the styrene/n-butyl acrylate copolymer (I) to the block copolymer (II) is from 10/90 to 90/10.

In another aspect of the present invention, there is provided a styrene copolymer composition comprising:

(I) a styrene/n-butyl acrylate copolymer comprising 80 to 89% by weight of styrene monomer units and 20 to 11% by weight of n-butyl acrylate monomer units; and (II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block, the block copolymer (II) comprising 75 to 85% by weight of vinyl aromatic hydrocarbon monomer units and 25 to 15% by weight of conjugated diene monomer units, wherein the vinyl aromatic hydrocarbon monomer unit moiety of the block copolymer (II) has a short segment ratio of from 10 to 20% by weight, wherein the short segment ratio is defined as the weight percentage, based on the total weight of vinyl aromatic hydrocarbon monomer units contained in the block copolymer (II), of the vinyl aromatic hydrocarbon monomer units contained in at least one short segment consisting of 1 to 3 vinyl aromatic hydrocarbon monomer units, wherein the at least two polymer blocks (A) contain a peak molecular weight-having polymer block exhibiting, in a gel permeation chromatogram of the at least two polymer blocks (A), at least one peak molecular weight in the range of from 20,000 to 70,000, and the content of the peak molecular weight-having polymer block in the block copolymer (II) is from 25 to 35% by weight, wherein the at least two polymer blocks (A) have a maximum weight polymer block and a minimum weight polymer block, wherein the weight ratio of the maximum weight polymer block to the minimum weight polymer block is from 1.0 to less than 1.2, and wherein the weight ratio of the styrene/n-butyl acrylate copolymer (I) to the block copolymer (II) is from 20/80 to 60/40.

For easy understanding of the present invention, the essential features and various preferred embodiments of the present invention are enumerated below.

1. A styrene copolymer composition comprising:

(I) a styrene/n-butyl acrylate copolymer comprising 80 to 89% by weight of styrene monomer units and 20 to 11% by weight of n-butyl acrylate monomer units; and (II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block, the block copolymer (II) comprising 65 to 90% by weight of vinyl aromatic hydrocarbon monomer units and 35 to 10% by weight of conjugated diene monomer units, wherein the vinyl aromatic hydrocarbon monomer unit moiety of the block copolymer (II) has a short segment ratio of from 1 to 25 t by weight, wherein the short segment ratio is defined as the weight percentage, based on the total weight of vinyl aromatic hydrocarbon monomer units contained in the block copolymer (II), of the vinyl aromatic hydrocarbon monomer units contained in at least one short segment consisting of 1 to 3 vinyl aromatic hydrocarbon monomer units, wherein the at least two polymer blocks (A) contain a maximum peak molecular weight polymer block exhibiting a maximum peak molecular weight in a gel permeation chromatogram of the at least two polymer blocks (A) and having at least one peak molecular weight in the range of from 30,000 to 150,000, and the content of the maximum peak molecular weight polymer block in the block copolymer (II) is from 20 to 50% by weight, wherein the at least two polymer blocks (A) have a maximum weight polymer block and a minimum weight polymer block, wherein the weight ratio of the maximum weight polymer block to the minimum weight polymer block is from 1.2 to 4.5, and wherein the weight ratio of the styrene/n-butyl acrylate copolymer (I) to the block copolymer (II) is from 10/90 to 90/10.

2. The styrene copolymer composition according to item 1 above, wherein the styrene/n-butyl acrylate copolymer (I) comprises 83 to 89% by weight of styrene monomer units and 17 to 11% by weight of n-butyl acrylate monomer units.

3. The styrene copolymer composition according to item 1 or 2 above, which provides a shaped article having a haze of 1.2% or less.

4. The styrene copolymer composition according to item 1 or 2 above, wherein the styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq P(T) \leq 2.91 \times 10^5 - 2350 \times T + 5 \times T^2$$

wherein T represents the measuring temperature (° C.) for the melt viscosity and P(T) represents the melt viscosity (poises) of the copolymer (I) as measured at temperature T (° C.).

5. The styrene copolymer composition according to item 1 or 2 above, wherein the styrene/n-butyl acrylate copolymer (I) exhibits a storage modulus in the range of from $1.5 \times 10^9$ to $2.5 \times 10^9$ Pa as measured at 30° C., and wherein the temperature at which the copolymer (I) exhibits a 50% storage modulus relative to the storage modulus at 30° C. is in the range of from 75 to 100° C.

6. The styrene copolymer composition according to item 1 or 2 above, which further comprises, as a stabilizer, 0.05 to 3 parts by weight of 2-(1-(2-hydroxy-3,5-di-t-pentylphenyl)ethyl)-4,6-di-t-pentylphenyl acrylate, relative to 100 parts by weight of the total of the styrene/n-butyl acrylate copolymer (I) and the block copolymer (II).

7. The styrene copolymer composition according to item 1 or 2 above, wherein the or each vinyl aromatic hydrocarbon/conjugated diene copolymer block (B) in the block copolymer (II) is a vinyl aromatic hydrocarbon/isoprene/1,3-butadiene copolymer block, and wherein the conjugated diene monomer units in the block copolymer (II) comprise isoprene monomer units and 1,3-butadiene monomer units, wherein the weight ratio of the isoprene monomer units to the 1,3-butadiene monomer units is in the range of from 7/25 to 13/11.

8. A block copolymer having a block configuration comprising (A) at least two polymer blocks each comprised mainly of vinyl aromatic hydrocarbon monomer units and (B) at least one vinyl aromatic hydrocarbon/isoprene/1,3-butadiene copolymer block having an isoprene monomer unit/1,3-butadiene monomer unit weight ratio in the range of from 5/11 to 3/5, the block copolymer comprising 65 to 90% by weight of vinyl aromatic hydrocarbon monomer units and 35 to 10% by weight of conjugated diene monomer units comprising isoprene monomer units and 1,3-butadiene monomer units, the block copolymer having an isoprene monomer unit/1,3-butadiene monomer unit weight ratio in the range of from 7/25 to 13/11, wherein the vinyl aromatic hydrocarbon monomer unit moiety of the block copolymer has a short segment ratio of from 1 to 25% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units, wherein the at least two polymer blocks (A) contain a maximum peak molecular weight polymer block exhibiting a maximum peak molecular weight in a gel permeation chromatogram of the at least two polymer blocks (A) and having at least one peak molecular weight in the range of from 30,000 to 150,000, and the content of the maximum peak molecular weight polymer block in the block copolymer is from 20 to 50% by weight, and wherein the at least two polymer blocks (A) have a maximum weight polymer block and a minimum weight polymer block, wherein the weight ratio of the maximum weight polymer block to the minimum weight polymer block is from 1.2 to 4.5.

9. A styrene copolymer composition comprising:

(I) a styrene/n-butyl acrylate copolymer comprising 80 to 89% by weight of styrene monomer units and 20 to 11% by weight of n-butyl acrylate monomer units; and (II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block, the block copolymer (II) comprising 75 to 85% by weight of vinyl aromatic hydrocarbon monomer units and 25 to 15% by weight of conjugated diene monomer units, wherein the vinyl aromatic hydrocarbon monomer unit moiety of the block copolymer (II) has a short segment ratio of from 10 to 20% by weight with respect to the vinyl aromatic hydrocarbon monomer units, wherein the short segment ratio is defined as the percent by weight, based on the total weight of vinyl aromatic hydrocarbon monomer units contained in the block copolymer (II), of the vinyl aromatic hydrocarbon monomer units contained in at least one short segment consisting of 1 to 3 vinyl aromatic hydrocarbon monomer units, wherein the at least two polymer blocks (A) contain a peak molecular weight-having polymer block exhibiting, in a gel permeation chromatogram of the at least two polymer blocks (A), at least one peak molecular weight in the range of from 20,000 to 70,000, and the content of the peak molecular weight-having polymer block in the block copolymer (II) is from 25 to 35% by weight, wherein the at least two polymer blocks (A) have a maximum weight polymer block and a minimum weight polymer block, wherein the weight ratio of the maximum weight polymer block to the minimum weight polymer block is from 1.0 to less than 1.2, and wherein the weight ratio of the styrene/n-butyl acrylate copolymer (I) to the block copolymer (II) is from 20/80 to 60/40.

10. The styrene copolymer composition according to item 9 above, wherein the styrene/n-butyl acrylate copolymer comprising 83 to 89% by weight of styrene monomer units and 17 to 11% by weight of n-butyl acrylate monomer units.

11. The styrene copolymer composition according to item 9 or 10 above, which provides a shaped article having a haze of 1.2% or less.

12. The styrene copolymer composition according to item 9 or 10 above, wherein the styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq P(T) \leq 2.91 \times 10^5 - 2350 \times T + 5 \times T^2$$

wherein T represents the measuring temperature (° C.) for the melt viscosity and P(T) represents the melt viscosity (poises) of the copolymer (I) as measured at temperature T (° C.)

13. The styrene copolymer composition according to item 9 or 10 above, wherein the styrene/n-butyl acrylate copolymer (I) exhibits a storage modulus in the range of from $1.5 \times 10^9$ to $2.5 \times 10^9$ Pa as measured at 30° C., and wherein the temperature at which the copolymer (I) exhibits a 50% storage modulus relative to the storage modulus at 30° C. is in the range of from 75 to 100° C.

14. The styrene copolymer composition according to item 9 or 10 above, which further comprises, as a stabilizer, 0.05 to 3 parts by weight of 2-(1-(2-hydroxy-3,5-di-t-pentylphenyl)ethyl)-4,6-di-t-pentylphenyl acrylate, relative to 100 parts by weight of the total of the styrene/n-butyl acrylate copolymer (I) and the block copolymer (II).

15. The styrene copolymer composition according to item 9 or 10, wherein the or each vinyl aromatic hydrocarbon/conjugated diene copolymer block (B) in the block copolymer (II) is a vinyl aromatic hydrocarbon/isoprene/1,3-butadiene copolymer block, and wherein the conjugated diene monomer units in the block copolymer (II) comprise isoprene monomer units and 1,3-butadiene monomer units, wherein the weight ratio of the isoprene monomer units to the 1,3-butadiene monomer units is in the range of from 7/18 to 6/11.

16. A block copolymer having a block configuration comprising (A) at least two polymer blocks each comprised mainly of vinyl aromatic hydrocarbon monomer units and (B) at least one vinyl aromatic hydrocarbon/isoprene/1,3-butadiene copolymer block, the block copolymer comprising 75 to 85% by weight of vinyl aromatic hydrocarbon monomer units and 25 to 15% by weight of conjugated diene monomer units comprising isoprene monomer units and 1,3-butadiene monomer units, the block copolymer having an isoprene monomer unit/1,3-butadiene monomer unit weight ratio in the range of from 7/18 to 6/11, wherein the vinyl aromatic hydrocarbon monomer unit moiety of the block copolymer has a short segment ratio of from 10 to 20% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units, wherein the at least two polymer blocks (A) contain a peak molecular weight-having polymer block exhibiting, in a gel permeation chromatogram of the at least two polymer blocks (A), at least one peak molecular weight in the range of from 20,000 to 70,000, and the content of the peak molecular weight-having polymer block in the block copolymer is from 25 to 35% by weight, and wherein the at least two polymer blocks (A) have a maximum weight polymer block and a minimum weight polymer block, wherein the weight ratio of the maximum weight polymer block to the minimum weight polymer block is from 1.0 to less than 1.2.

Hereinbelow, the present invention is described in detail.

In the present invention, the monomer units of the polymer are named in accordance with a nomenclature wherein the names of the original monomers from which the monomer units are derived are used with the term "unit" attached thereto. For example, the term "vinyl aromatic hydrocarbon monomer unit" means a monomer unit which is formed in a polymer obtained by the polymerization of the vinyl aromatic hydrocarbon monomer. The vinyl aromatic hydrocarbon monomer unit has a molecular structure wherein the two carbon atoms of a substituted ethylene group derived from a substituted vinyl group respectively form linkages to adjacent vinyl aromatic hydrocarbon monomer units. Similarly, the term "conjugated diene monomer unit" means a monomer unit which is formed in a polymer obtained by the polymerization of the conjugated diene monomer. The conjugated diene monomer unit has a molecular structure wherein two carbon atoms of an olefin derived from a conjugated diene monomer respectively form linkages to adjacent conjugated diene monomer units.

In the present invetion, as mentioned above, there is provided a styrene copolymer composition comprising: (I) a styrene/n-butyl acrylate copolymer comprising styrene monomer units and n-butyl acrylate monomer units in a specific ratio, and (II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block, wherein the block copolymer (II) comprises vinyl aromatic hydrocarbon monomer units and conjugated diene monomer units in a specific ratio. In the first aspect of the present invention, there is provided the styrene copolymer composition which contains the above-mentioned "asymmetric block copolymer (II)". In the second aspect of the present invention, there is provided the styrene copolymer composition which contains the above-mentioned "symmetric block copolymer (II)".

First, an explanation is made with respect to the styrene/n-butyl acrylate copolymer (I) which is used in each of the compositions of the first and second aspects.

The styrene/n-butyl acrylate copolymer (I) used in the present invention comprises 80 to 89% by weight of styrene monomer units and 20 to 11% by weight of n-butyl acrylate monomer units. The styrene monomer unit content of the styrene/n-butyl acrylate copolymer (I) is preferably from 83 to 89% by weight. When the styrene monomer unit content of the styrene/n-butyl acrylate copolymer (I) is less than 80% by weight, disadvantages are likely to be caused wherein sheets or films produced from the styrene copolymer composition suffer fusion bonding (e.g., fusion bonding between the sheets) at relatively low temperatures. When the styrene monomer unit content of the styrene/n-butyl acrylate copolymer (I) is more than 89 t by weight, the transparency of a shaped article produced from the styrene copolymer composition becomes disadvantageously low.

It is preferred that the styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq P(T) \leq 2.91 \times 10^5 - 2350 \times T + 5 \times T^2$$

wherein T represents the measuring temperature (° C.) for the melt viscosity and P(T) represents the melt viscosity (poises) of the copolymer (I) as measured at temperature T (° C.).

FIG. 1 is a graph for explaining a preferred range of the melt viscosity P(T) of the styrene/n-butyl acrylate copolymer (I) used in the present invention, as measured at a temperature in the range of from 180 to 240° C. In FIG. 1, a curve drawn by solid line shows the lower limit of the above-mentioned preferred range of the melt viscosity, wherein the lower limit is defined by the following formula:

$$\text{Lower limit of the melt viscosity} = 1.46 \times 10^5 - 1119.2 \times T + 2.256 \times T^2$$

wherein T represents the measuring temperature (° C.) for the melt viscosity, and a curve drawn by broken line shows the upper limit of the above-mentioned preferred range of the melt viscosity, wherein the upper limit is defined by the following formula:

$$\text{Upper limit of the melt viscosity} = 2.91 \times 10^5 - 2350 \times T + 5 \times T^2$$

wherein T represents the measuring temperature (° C.) for the melt viscosity.

When the melt viscosity P(T) is higher than the upper limit defined by the above-mentioned formula, it is likely that a sheet produced from the styrene copolymer composition suffers occurrence of relatively small FE's. On the other hand, when the melt viscosity P(T) is lower than the lower limit defined by the above-mentioned formula, it is likely that a sheet produced from the styrene copolymer composition suffers occurrence of relatively large FE's.

In the present invention, the melt viscosity P(T) of the styrene/n-butyl acrylate copolymer (I) at a temperature in the range of from 180 to 240° C. can be measured using a capirograph (manufactured and sold by Toyo Seiki Co., Ltd., Japan) under conditions wherein the shear rate (SR) is 61 sec$^{-1}$, the capillary length (L) is 10.0 mm, the capillary diameter (D) is 1.00 mm and the barrel diameter (B) is 9.50 mm.

With respect to the storage modulus of the styrene/n-butyl acrylate copolymer (I), it is preferred that the storage modulus as measured at 30° C. is in the range of from $1.5 \times 10^9$ to $2.5 \times 10^9$ Pa, and that the temperature at which the copolymer (I) exhibits a 50% storage modulus relative to the storage modulus at 30° C. is in the range of from 75 to 100° C. It is more preferred that the storage modulus as measured at 30° C. is in the range of from $1.7 \times 10^9$ to $2.3 \times 10^9$ Pa, and that the temperature at which the copolymer (I) exhibits a 50% storage modulus relative to the storage modulus at 30° C. is in the range of from 75 to 85° C.

When the storage modulus of the styrene/n-butyl acrylate copolymer (I) as measured at 30° C. is lower than $1.5 \times 10^9$ Pa, it is likely that the stiffness of a shaped article produced from the styrene copolymer composition is not satisfactorily improved. On the other hand, when the storage modulus of the styrene/n-butyl acrylate copolymer (I) as measured at 30° C. is higher than $2.5 \times 10^9$ Pa, it is likely that the elongation at break of a shaped article produced from the styrene copolymer composition is not satisfactorily improved. Further, when the temperature at which the copolymer (I) exhibits a 50 t storage modulus relative to the storage modulus at 30° C. is lower than 75° C., it is likely that a sheet or film produced from the styrene copolymer composition is not satisfactorily improved with respect to the resistance to fusion bonding at relatively low temperatures. On the other hand, when the temperature at which the copolymer (I) exhibits a 50% storage modulus relative to the storage modulus at 30° C. is higher than 100° C., it is likely that a heat shrinkable film produced from the styrene copolymer composition is not satisfactorily improved with respect to the heat shrinkability at relatively low heating temperatures.

In the present invention, the storage modulus of the styrene/n-butyl acrylate copolymer (I) is measured using DMA983 (manufactured and sold by DUPONT, U.S.A.) under conditions wherein the frequency is the resonant frequency and the rate of temperature elevation is 2° C./min.

In the present invention, the melt viscosity P(T) of the styrene/n-butyl acrylate copolymer (I) at a temperature in the range of from 180 to 240° C., the storage modulus of the copolymer (I) as measured at 30° C., and the temperature at which the copolymer (I) exhibits a 50% storage modulus relative to the storage modulus at 30° C. can be controlled by appropriately adjusting various conditions in the below-described polymerization method for producing the copolymer (I), such as the amounts of styrene, n-butyl acrylate and a molecular weight modifier, the residence time of the raw materials in the polymerizer used for the polymerization, and the polymerization temperature.

The styrene/n-butyl acrylate copolymer (I) used in the present invention can be produced by conventional methods, such as a bulk polymerization, a solution polymerization, a suspension polymerization and an emulsion polymerization.

From the viewpoint of improving processability of the styrene copolymer composition, the melt flow rate (hereinafter, frequently referred to as "MFR") of the styrene/n-butyl acrylate copolymer (I) is preferably from 0.1 to 20 g/10 min, more preferably from 1 to 10 g/10 min, as measured in accordance with JISK-6870 under conditions "G" prescribed therein (temperature: 200° C., load: 5 kg).

Hereinbelow, explanations are made with respect to the asymmetric block copolymer (II) used in the composition of the first aspect and the symmetric block copolymer (II) used in the composition of the second aspect.

The asymmetric block copolymer (II) used in the composition of the first aspect comprises 65 to 90% by weight of vinyl aromatic hydrocarbon monomer units and 35 to 10% by weight of conjugated diene monomer units. It is preferred that the asymmetric block copolymer (II) comprises 70 to 85% by weight of vinyl aromatic hydrocarbon monomer units and 30 to 25% by weight of conjugated diene monomer units.

When the asymmetric block copolymer (II) used in the composition of the first aspect comprises less than 65% by weight of vinyl aromatic hydrocarbon monomer units and more than 35% by weight of conjugated diene monomer units, a shaped article produced from the composition suffers marked occurrence of FE's. On the other hand, when the asymmetric block copolymer (II) comprises more than 90% by weight of vinyl aromatic hydrocarbon monomer units and less than 10% by weight of conjugated diene monomer units, the elongation at break of a shaped article produced from the composition becomes disadvantageously low.

The symmetric block copolymer (II) used in the composition of the second aspect comprises 75 to 85% by weight of vinyl aromatic hydrocarbon monomer units and 25 to 15% by weight of conjugated diene monomer units. It is preferred that the symmetric block copolymer (II) comprises 77 to 83% by weight of vinyl aromatic hydrocarbon monomer units and 23 to 17% by weight of conjugated diene monomer units. When the symmetric block copolymer (II) used in the composition of the second aspect comprises less than 75% by weight of vinyl aromatic hydrocarbon monomer units and more than 25% by weight of conjugated diene monomer units, a shaped article produced from the composition suffers marked occurrence of FE's. On the other hand, when the symmetric block copolymer (II) comprises more than 85% by weight of vinyl aromatic hydrocarbon monomer units and less than 15% by weight of conjugated diene monomer units, the elongation at break of a shaped article produced from the composition becomes disadvantageously low.

Each of the asymmetric block copolymer (II) used in the composition of the first aspect and the symmetric block copolymer (II) in the composition of the second aspect has a block configuration comprising (A) at least two polymer blocks each comprised mainly of vinyl aromatic hydrocarbon monomer units and (B) at least one vinyl aromatic hydrocarbon/conjugated diene copolymer block. In the present invention, the term "polymer block comprised mainly of vinyl aromatic hydrocarbon monomer units" means a polymer block having a vinyl aromatic hydrocarbon monomer unit content of 70 t by weight or more, whereas the term "vinyl aromatic hydrocarbon/conjugated diene copolymer block" means a vinyl aromatic hydrocarbon/conjugated diene copolymer block having a vinyl aromatic hydrocarbon monomer unit content of less than 70% by weight.

As examples of the asymmetric block copolymer (II) used in the composition of the first aspect and the symmetric block copolymer (II) used in the composition of the second aspect, there can be mentioned linear block copolymers having block configurations represented by the following formulae (1), (2) and (3):

$$A\text{-}(B\text{-}A)_n, \quad (1)$$

$$A\text{-}(B\text{-}A)_n\text{-}B \text{ and} \quad (2)$$

$$B\text{-}(A\text{-}B)_{n+1}; \text{ and} \quad (3)$$

branched block copolymers having block configurations represented by the following formulae (4), (5), (6) and (7):

$$((A\text{-}B)_k)_{m+2}\text{-}X, \quad (4)$$

$$((A\text{-}B)_k\text{-}A)_{m+2}\text{-}X, \quad (5)$$

$$((B\text{-}A)_k)_{m+2}\text{-}X \text{ and} \quad (6)$$

$$((B\text{-}A)_k\text{-}B)_{m+2}\text{-}X. \quad (7)$$

In formulae (1) to (7) above, each A independently represents a polymer block comprised mainly of vinyl aromatic hydrocarbon monomer units; each B independently represents a vinyl aromatic hydrocarbon/conjugated diene copolymer block or a conjugated diene homopolymer block; X is a residue of a coupling agent, such as silicon tetrachloride, tin tetrachloride, epoxidized soybean oil, tetraglycidyl-1,3-bisaminomethylcyclohexane, a hydrocarbon polyhalide, a carboxylic ester or a polyvinyl compound, or a residue of a polymerization initiator, such as a multifunctional organolithium compound; and each of n, k and m represents a natural number and is generally from 1 to 5.

In the present invention, the term "branched block copolymer" means a block copolymer having a structure in which a plurality of polymer chains are bonded together by a coupling agent having a functionality of from 3 to 8 or by a polymerization initiator (such as an organolithium compound) having a functionality of from 3 to 8, so that the polymer chains extend from the residue of the coupling agent or the residue of the polymerization initiator.

Each of the asymmetric block copolymer (II) used in the composition of the first aspect and the symmetric block copolymer (II) used in the composition of the second aspect can be produced by a method in which vinyl aromatic hydrocarbon monomers and conjugated diene monomers are polymerized in a hydrocarbon solvent in the presence of an organolithium compound as a polymerization initiator. When the block copolymer (II) is produced by the above-mentioned method, the reaction conditions are as follows. With respect to the polymerization reaction for producing the block copolymer (II), the reaction temperature is generally from −10 to 150° C., preferably from 40 to 120° C. The polymerization reaction time varies depending on other reaction conditions; however, the polymerization reaction time is generally 10 hours or less, preferably from 0.5 to 5 hours. It is preferred that the polymerization reaction is performed in an atmosphere of an inert gas, such as nitrogen gas. With respect to the polymerization reaction pressure, there is no particular limitation so long as the pressure is sufficient to maintain the monomers and the solvent in a liquid state at a temperature within the above-mentioned range of polymerization reaction temperature. Further, care must be taken so as to prevent impurities (such as water, oxygen and carbon dioxide gas), which are likely to deactivate not only the polymerization catalyst but also a living polymer being formed, from intruding into the polymerization reaction system.

In each of the compositions of the first and second aspects, by incorporating a residue of a terminal modifier having at least one polar group into the terminal of the block copolymer (II), the miscibility of the styrene/n-butyl acrylate copolymer (I) with the block copolymer (II) can be improved. As an example of the terminal modifier, there can be mentioned a terminal modifer having at least one polar group selected from the following polar groups (a) to (f): (a) a polar group having an active hydrogen; (b) a polar group having a nitrogen atom; (c) a polar group having an epoxy group or a thioepoxy group; (d) a polar group having a carbonyl group or a thiocarbonyl group; (e) a polar group having a phosphorus atom; and (f) a polar group having a structural unit represented by any one of the following formulae:

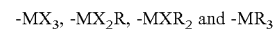

$$-MX_3, -MX_2R, -MXR_2 \text{ and } -MR_3$$

wherein M represents an Si atom, a Ge atom, an Sn atom or a Pb atom, X represents a halogen atom, R represents an alkyl group, a phenolic group or an alkoxy group.

In the case of a terminal modifier having a polar group (f), at least two structural units of the above formulae may be bonded to each other or separately present in the terminal modifier. Specific examples of terminal modifiers include a compound having a carbonyl group, a thiocarbonyl group, an acid halide group, an acid anhydride group, an aldehyde group, a thioaldehyde group, a carboxylic ester group, an amide group, a sulfonic acid group, a phosphoric acid group, a phosphoric ester group, an amino group, an imino group, a nitrile group, a pyridyl group, a quinoline group, an epoxy group, a thioepoxy group, an isocyanate group or isothiocyanate group, a silicon compound containing a halogen atom, and a tin compound containing a halogen atom. More specific examples of terminal modifiers include those which are described in Examined Japanese Patent Application Publication No. 4-39495 (corresponding to U.S. Pat. No. 5,115,035).

In the asymmetric block copolymer (II) of the composition of the first aspect, the (at least two) polymer blocks (A) each comprised mainly of vinyl aromatic hydrocarbon monomer units contain a maximum peak molecular weight polymer block exhibiting a maximum peak molecular weight in a gel permeation chromatogram of the polymer blocks (A) and having at least one peak molecular weight in the range of from 30,000 to 150,000, preferably from 30,000 to 130,000, and the content of the maximum peak molecular weight polymer block in the block copolymer (II) is from 20 to 50% by weight, preferably from 25 to 45% by weight. When the peak molecular weight of the maximum peak molecular weight polymer block is less than 30,000, and/or the content of the maximum peak molecular weight polymer block in the block copolymer (II) is less than 20% by weight, not only does the stiffness of a shaped article produced from the composition become disadvantageously low, but also a film produced from the composition is likely to suffer fusion bonding at relatively low temperatures. On the other hand, when the peak molecular weight of the maximum peak molecular weight polymer block is more than 150,000, and/or the content of the maximum peak molecular weight polymer block in the block copolymer (II) is more than 50% by weight, the 80° C. shrinkage factor and natural shrinkage factor of a heat shrinkable film produced from the composition become disadvantageous low.

In the symmetric block copolymer (II) of the composition of the second aspect, the (at least two) polymer blocks (A) each comprised mainly of vinyl aromatic hydrocarbon monomer units contain a peak molecular weight-having polymer block exhibiting, in a gel permeation chromatogram of the polymer blocks (A), at least one peak molecular weight in the range of from 20,000 to 70,000, preferably from 25,000 to 65,000, and the content of the peak molecular weight-having polymer block in the block copolymer (II) is from 25 to 35% by weight. When the peak molecular weight of the peak molecular weight-having polymer block is less than 20,000, and/or the content of the peak molecular weight-having polymer block in the block copolymer (II) is less than 25% by weight, not only does the stiffness of a shaped article produced from the composition become disadvantageously low, but also a film produced from the composition is likely to suffer fusion bonding at relatively low temperatures. On the other hand, when the peak molecular weight of the peak molecular weight-having polymer block is more than 70,000, and/or the content of the peak molecular weight-having polymer block in the block copolymer (II) is more than 35% by weight, the 80° C. shrinkage factor and natural shrinkage factor of a heat shrinkable film produced from the composition become disadvantageous low.

With respect to the polymer blocks (A) of each of the asymmetric block copolymer (II) in the composition of the first aspect and the symmetric block copolymer (II) in the composition of the second aspect, the peak molecular weight(s) of peak molecular weight-having polymer block(s) (including the maximum peak molecular weight polymer block) of the polymer blocks (A) can be obtained from the molecular weight distributions of polymer blocks forming the polymer blocks (A), and the content(s) of the peak molecular weight-having polymer block(s) in the block copolymer (II) can be obtained from the amounts of vinyl aromatic hydrocarbon monomers, which are employed in the polymerization reactions for forming polymer blocks (A).

When the polymer blocks (A) are vinyl aromatic hydrocarbon homopolymer blocks, the peak molecular weight (s) of the peak moleclar weight-having polymer block (s) of the polymer blocks (A) can also be measured by the following method. First, the block copolymer (II) is subject to oxidative degradation using t-butyl hydroperoxide in the presence of osmium tetraoxide as a catalyst, to thereby separate the vinyl aromatic hydrocarbon polymer blocks from the block copolymer (II), followed by recovering the resultant vinyl aromatic hydrocarbon polymer components (except for those which have an average degree of polymerization of about 30 or less) (see I. M. Kolthoff et al., J. Polym. Sci. vol. 1, p. 429, 1946). The obtained vinyl aromatic hydrocarbon polymer components are subjected to GPC to thereby obtain a GPC chromatogram. Then, using a calibration curve obtained from GPC chromatograms showing the peak molecular weights of standard monodisperse polystyrene samples, the peak molecular weights of the vinyl aromatic hydrocarbon polymer components are determined by any of conventional methods (see, for example, Gel Permeation Chromatography, 1976, published by Maruzen Co., Ltd., Japan).

The peak molecular weights of peak molecular weight-having polymer blocks of the polymer blocks (A) can be controlled by appropriately adjusting the amounts of a catalyst and vinyl aromatic hydrocarbon monomers, which are used for forming the vinyl aromatic hydrocarbon polymer blocks.

As mentioned above, the contents of peak molecular weight-having polymer blocks in the polymer blocks (A) can be obtained either from the area ratio of the peaks in the above-mentioned GPC chromatogram obtained with respect to the vinyl aromatic hydrocarbon polymer components, or from the weight ratio of the amounts of vinyl aromatic hydrocarbon monomers, which are employed in polymerization reactions for forming vinyl aromatic hydrocarbon homopolymer blocks of the polymer blocks (A).

In each of the asymmetric block copolymer (II) in the composition of the first aspect and the symmetric block copolymer (II) in the composition of the second aspect, the polymer blocks (A) each comprised mainly of vinyl aromatic hydrocarbon monomer units have a maximum weight polymer block and a minimum weight polymer block. Hereinafter, the weight ratio of the maximum weight polymer block to the minimum weight polymer block is frequently referred to as the "maximum block/minimum block weight ratio".

In the asymmetric block copolymer (II) in the composition of the first aspect, the maximum weight polymer block of the polymer blocks (A) is the same as the above-mentioned maximum peak molecular weight polymer block of the polymer blocks (A).

In the polymer blocks (A) used in the asymmetric block copolymer (II) in the composition of the first aspect, the maximum block/minimum block weight ratio is relatively large. Specifically, the maximum block/minimum block weight ratio is from 1.2 to 4.5, preferably from 1.5 to 4.0. By virtue of this feature, a shaped article produced from the composition of the first aspect exhibits excellent impact resistance (such as excellent surface impact strength), even though the anisotropy of the shaped article becomes slightly large. When the maximum block/minimum block weight ratio is less than 1.2, the impact resistance of a shaped article produced from the composition becomes disadvantageously low. On the other hand, when the maximum block/minimum block weight ratio is more than 4.5, the transparency of a shaped article produced from the composition becomes disadvantageously low.

In the polymer blocks (A) used in the symmetric block copolymer (II) of the composition of the second aspect, it is required that the maximum block/minimum block weight ratio be relatively small. Specifically, the maximum block/minimum block weight ratio needs to be from 1.0 to less than 1.2. By virtue of this feature, a shaped article produced from the composition exhibits an advantageously small anisotropy. When the maximum block/minimum block weight ratio is 1.2 or more, disadvantages are caused wherein an extruded sheet produced from the composition exhibits a large anisotropy and, hence, is likely to be split in an extrusion direction of the sheet.

The maximum block/minimum block weight ratio can be calculated from the amounts of monomers, which are employed in polymerization reactions for forming the polymer blocks (A). When the polymer blocks (A) are vinyl aromatic hydrocarbon homopolymer blocks, the maximum block/minimum block weight ratio can also be calculated from the area ratio of the peaks in a GPC chromatogram obtained with respect to the vinyl aromatic hydrocarbon polymer components (which are obtained by the above-mentioned method in which the block copolymer (II) is subjected to oxidative degradation using t-butyl hydroperoxide in the presence of osmium tetraoxide as a catalyst), to thereby separate the vinyl aromatic hydrocarbon polymer blocks from the block copolymer (II), followed by recovering the resultant vinyl aromatic hydrocarbon polymer components.

As examples of hydrocarbon solvents used in the production of each of the asymmetric block copolymer (II) in the composition of the first aspect and the symmetric block copolymer (II) in the composition of the second aspect, there can be mentioned aliphatic hydrocarbons, such as butane, pentane, hexane, isopentane, heptane, octane and isooctane; alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These hydrocarbon solvents can be used individually or in combination.

As examples of vinyl aromatic monomer units used in each of the asymmetric block copolymer (II) in the composition of the first aspect and the symmetric block copolymer (II) in the composition of the second aspect, there can be mentioned a styrene monomer unit, an o-methylstyrene monomer unit, a p-methylstyrene monomer unit, a p-tert-butylstyrene monomer unit, a 2,4-dimethylstyrene monomer unit, an a-methylstyrene monomer unit, a vinylnaphthalene monomer unit, a vinylanthracene monomer unit, and a 1,1-diphenylethylene monomer unit. Of these, a styrene monomer unit is especially preferred. These vinyl aromatic monomer units can be used individually or in combination.

As examples of conjugated diene monomer units used in each of the asymmetric block copolymer (II) in the composition of the first aspect and the symmetric block copolymer (II) in the composition of the second aspect, there can be mentioned a 1,3-butadiene monomer unit, a 2-methyl-1,3-butadiene (isoprene) monomer unit, a 2,3-dimethyl-1,3-butadiene monomer unit, a 1,3-pentadiene monomer unit and a 1,3-hexadiene monomer unit. These conjugated diene monomer units can be used individually or in combination. Of these, a 1,3-butadiene monomer unit and an isoprene monomer unit are preferred.

In the composition of the first aspect, from the viewpoint of effectively suppressing occurrence of FE's in a shaped article produced from the composition, it is preferred to use a specific species of the asymmetric block copolymer (II), wherein the or each vinyl aromatic hydrocarbon/conjugated diene copolymer block (B) in the block copolymer (II) is a vinyl aromatic hydrocarbon/isoprene/1,3-butadiene copolymer block, and wherein the conjugated diene monomer units in the block copolymer (II) comprise isoprene monomer units and 1,3-butadiene monomer units, wherein the weight ratio of the isoprene monomer units to the 1,3-butadiene monomer units is in the range of from 7/25 to 13/11. In this case, it is more preferred that the or each vinyl aromatic hydrocarbon/isoprene/1,3-butadiene copolymer block has an isoprene monomer unit/1,3-butadiene monomer unit ratio in the range of from 5/11 to 3/5.

In other words, the above-mentioned specific species of the asymmetric block copolymer (II) can be advantageously used for obtaining a styrene copolymer composition which can be effectively used for producing a shaped article which is free from marked occurrence of FE's. Specifically, the above-mentioned specific species of the asymmetric block copolymer (II) is a block copolymer having a block configuration comprising (A) at least two polymer blocks each comprised mainly of vinyl aromatic hydrocarbon monomer units and (B) at least one vinyl aromatic hydrocarbon/isoprene/1,3-butadiene copolymer block having an isoprene monomer unit/1,3-butadiene monomer unit weight ratio in the range of from 5/11 to 3/5, the block copolymer comprising 65 to 90% by weight of vinyl aromatic hydrocarbon monomer units and 35 to 10% by weight of conjugated diene monomer units comprising isoprene monomer units and 1,3-butadiene monomer units, the block copolymer having an isoprene monomer unit/1,3-butadiene monomer unit weight ratio in the range of from 7/25 to 13/11, wherein the vinyl aromatic hydrocarbon monomer unit moiety of the block copolymer has a short segment ratio of from 1 to 25% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units, wherein the at least two polymer blocks (A) contain a maximum peak molecular weight polymer block exhibiting a maximum peak molecular weight in a gel permeation chromatogram of the at least two polymer blocks (A) and having at least one peak molecular weight in the range of from 30,000 to 150,000, and the content of the maximum peak molecular weight polymer block in the block copolymer (II) is from 20 to 50% by weight, and wherein the at least two polymer blocks (A) have a maximum weight polymer block and a minimum weight polymer block, wherein the weight ratio of the maximum weight polymer block to the minimum weight polymer block is from 1.2 to 4.5.

In the composition of the second aspect, from the viewpoint of effectively suppressing occurrence of FE's in a shaped article produced from the composition, it is preferred to use a specific species of the symmetric block copolymer (II), wherein the or each vinyl aromatic hydrocarbon/conjugated diene copolymer block (B) in the block copolymer (II) is a vinyl aromatic hydrocarbon/isoprene/1,3-butadiene copolymer block, and wherein the conjugated diene monomer units in the block copolymer (II) comprise isoprene monomer units and 1,3-butadiene monomer units, wherein the weight ratio of the isoprene monomer units to the 1,3-butadiene monomer units is in the range of from 7/18 to 6/11.

In other words, the above-mentioned specific species of the symmetric block copolymer (II) can be advantageously used for obtaining a styrene copolymer composition which can be used for producing a shaped article which is free from marked occurrence of FE's. Specifically, the above-mentioned specific species of the symmetric block copolymer (II) is a block copolymer having a block configuration comprising (A) at least two polymer blocks each comprised mainly of vinyl aromatic hydrocarbon monomer units and (B) at least one vinyl aromatic hydrocarbon/isoprene/1,3-butadiene copolymer block, the block copolymer comprising 75 to 85% by weight of vinyl aromatic hydrocarbon monomer units and 25 to 15% by weight of conjugated diene monomer units comprising isoprene monomer units and 1,3-butadiene monomer units, the block copolymer having an isoprene monomer unit/1,3-butadiene monomer unit weight ratio in the range of from 7/18 to 6/11, wherein the vinyl aromatic hydrocarbon monomer unit moiety of the block copolymer has a short segment ratio of from 10 to 20% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units, wherein the at least two polymer blocks (A) contain a peak molecular weight-having polymer block exhibiting, in a gel permeation chromatogram of the at least two polymer blocks (A), at least one peak molecular weight in the range of from 20,000 to 70,000, and the content of the peak molecular weight-having polymer block in the block copolymer (II) is from 25 to 35% by weight, and wherein the at least two polymer blocks (A) have a maximum weight polymer block and a minimum weight polymer block, wherein the weight ratio of the maximum weight polymer block to the minimum weight polymer block is from 1.0 to less than 1.2.

Further, in each of the compositions of the first and second aspects, from the viewpoint of effectively suppressing occurrence of FE's in a shaped article produced therefrom, it is also preferred that the aliphatic double bonds of the conjugated diene monomer units in the block copolymer (II) are partially hydrogenated, wherein the degree of hydrogenation of the aliphatic double bonds is from 1 to 50%, more advantageously from 3 to 40%, most advantageously from 5 to 30%.

In the present invention, the "degree of hydrogenation" of the aliphatic double bonds of the conjugated diene monomer units in the block copolymer (II) means the percentage (%) of the aliphatic double bonds of the conjugated diene monomer units in the block copolymer (II), which have been hydrogenated and converted to saturated hydrocarbon bonds, based on the total number of aliphatic double bonds of the conjugated diene monomer units in the block copolymer (II) before the hydrogenation.

The degree of hydrogenation can be measured by means of an infrared (IR) spectrophotometer, a nuclear magnetic resonance (NMR) apparatus or the like.

As examples of catalysts used for the hydrogenation of the block copolymer (II), there can be mentioned heterogeneous catalysts and homogeneous catalysts.

Specific examples of heterogeneous catalysts include a carrier-supported catalyst comprising a metal (such as Ni, Pt, Pd or Ru) supported on a carrier (such as carbon, silica, alumina or diatomaceous earth).

Specific examples of homogeneous catalysts include the so-called Ziegler type catalysts, such as a catalyst comprising an organic acid salt or acetylaceton salt of Ni, Co, Fe or Cr and a reducing agent (such as an organoaluminum compound); the so-called organometal complex catalysts, such as an organometal compound containing Ru, Rh or the like; and catalysts comprising a titanocene compound and a reducing agent (such as an organolithium compound, an organoaluminum compound or an organomagnesium compound).

As specific examples of the method for partially hydrogenating the aliphatic double bonds of the conjugated diene monomer units in the block copolymer (II), there can be mentioned methods described in Examined Japanese Patent Application Publication No. 42-8704 (corresponding to AU 6453173, CA 815575 and DE 1222260), Examined Japanese Patent Application Publication No. 43-6636 (corresponding to U.S. Pat. No. 3,333,024), Examined Japanese Patent Application Publication No. 63-4841 (corresponding to U.S. Pat. No. 4,501,857) and Examined Japanese Patent Application Publication No. 63-5401 (corresponding to U.S. Pat. No. 4,501,857), in each of which the hydrogenation is performed in an inert solvent in the presence of a hydrogenation catalyst. Of the methods described in the above-mentioned patent documents, those which are described in Examined Japanese Patent Application Publication Nos. 63-4841 and 63-5401 are preferred.

With respect to the asymmetric block copolymer (II) used in the composition of the first aspect, the vinyl aromatic hydrocarbon monomer unit moiety of the block copolymer (II) has a short segment ratio of from 1 to 25% by weight, preferably from 5 to 20% by weight, wherein the short segment ratio is defined as the weight percentage, based on the total weight of vinyl aromatic hydrocarbon monomer units contained in the asymmetric block copolymer (II), of the vinyl aromatic hydrocarbon monomer units contained in at least one short segment consisting of 1 to 3 vinyl aromatic hydrocarbon monomer units. When the short segment ratio is less than 1% by weight, the elongation of a sheet or film produced from the composition becomes disadvantageously low. On the other hand, when the short segment ratio is more than 25% by weight, disadvantages are likely to be caused wherein a sheet or film produced from the composition suffers marked deformation when heated, i.e., the dimensional stability of the sheet or film becomes low.

With respect to the symmetric block copolymer (II) used in the composition of the second aspect, the vinyl aromatic hydrocarbon monomer unit moiety of the block copolymer (II) has a short segment ratio of from 10 to 20%, wherein the short segment ratio is as defined above with respect to the asymmetric block copolymer (II) used in the composition of the first aspect. When the short segment ratio is less than 10% by weight, the elongation of a sheet or film produced from the composition becomes disadvantageously low. On the other hand, when the short segment ratio is more than 20% by weight, disadvantages are likely to be caused wherein a sheet or film produced from the composition suffers deformation when heated, i.e., the dimensional stability of the sheet or film becomes low.

The short segment ratio of the vinyl aromatic hydrocarbon monomer unit moiety of the block copolymer can be measured by the following method. The block copolymer is dissolved in dichloromethane. The resultant solution is subjected to oxidative degradation with ozone ($O_3$) to obtain an ozonide. The obtained ozonide is subjected to reduction in diethyl ether in the presence of lithium aluminum hydride, followed by hydrolysis with pure water. From the resultant is recovered a vinyl aromatic hydrocarbon component. The vinyl aromatic hydrocarbon component is subjected to gel permeation chromatography (GPC) to obtain a GPC chromatogram. By calculating the area ratio of the peaks in the obtained GPC chromatogram, the short segment ratio is obtained (see Yasuyuki Tanaka, Hisaya Sato and Yasunobu Nakafutami, "Koubunshi Gakkai Yokoushu (Preprints of Meeting of the Society of Polymer Science)", Vol. 29, p. 2051, 1980, Japan).

With respect to each of the asymmetric block copolymer (II) used in the composition of the first aspect and the symmetric block copolymer (II) used in the composition of the second aspect, the short segment ratio of the vinyl aromatic hydrocarbon monomer unit moiety of the block copolymer (II) can be controlled by appropriately adjusting the amounts of vinyl aromatic hydrocarbon monomers and conjugated diene monomers, which are subjected to copolymerization for producing the vinyl aromatic hydrocarbon/conjugated diene copolymer block(s) in the block copolymer (II), the relationship between polymerization reactivities of the monomers subjected to copolymerization, and the like. Illustratively stated, the short segment ratio can be controlled by a method in which vinyl aromatic hydrocarbon monomers and conjugated diene monomers are copolymerized while continuously adding a mixture thereof to the polymerization reaction system, or by a method in which vinyl aromatic hydrocarbon monomers and conjugated diene monomers are subjected to copolymerization in the presence of a polar compound or a randomizing agent. These methods can be employed individually or in combination.

Examples of polar compounds and randomizing agents include ethers, such as tetrahydrofuran, diethylene glycol dimethyl ether and diethylene glycol dibutyl ether; amines, such as triethylamine and tetramethylethylenediamine; thioethers; phosphines; phosphoramides; salts of alkylbenzenesulfonic acid; and potassium and sodium alkoxides.

Each of the asymmetric block copolymer (II) used in the composition of the first aspect and the symmetric block copolymer (II) used in the composition of the second aspect generally has a number average molecular weight of from 10,000 to 500,000. The number average molecular weight of the block copolymer (II) can be determined by GPC using a calibration curve obtained with respect to standard monodisperse polystyrene samples.

In each of the compositions of the first and second aspects, from the viewpoint of improving processability the composition, the MFR of the block copolymer (II) is preferably from 0.1 to 50 g/10 min, more preferably from 1 to 20 g/10 min.

In the composition of the first aspect, the weight ratio of the styrene/n-butyl acrylate copolymer (I) to the asymmetric block copolymer (II) is from 10/90 to 90/10, preferably from 20/80 to 80/20.

When the amount of the styrene/n-butyl acrylate copolymer (I) is more than 90% by weight, based on the total weight of the styrene/n-butyl acrylate copolymer (I) and the asymmetric block copolymer (II), the impact resistance of a shaped article produced from the composition becomes disadvantageously low. On the other hand, when the amount of the styrene/n-butyl acrylate copolymer (I) is less than 10% by weight, the stiffness of a shaped article produced from the composition becomes disadvantageously low.

In the composition of the second aspect, the weight ratio of the styrene/n-butyl acrylate copolymer (I) to the symmetric block copolymer (II) is from 20/80 to 60/40.

When the amount of the styrene/n-butyl acrylate copolymer (I) is more than 60% by weight, based on the total weight of the styrene/n-butyl acrylate copolymer (I) and the symmetric block copolymer (II), the impact resistance of a shaped article produced from the composition becomes disadvantageously low. On the other hand, when the amount of the styrene/n-butyl acrylate copolymer (I) is less than 20% by weight, the stiffness of a shaped article produced from the composition becomes disadvantageously low.

In each of the compositions of the first and second aspects, it is preferred that a shaped article produced from the composition has a haze of 1.2% or less, more advantageously 1.0% or less. When the haze is more than 1.2%, disadvantages are likely to be caused in that, for example, when the composition is used for producing a blister pack or case (transparent package or case), the contents of the blister pack or case tend to appear slightly whitish when observed through the blister pack or case.

In the present invention, the haze is measured as follows. The composition of the present invention is subjected to molding using a sheet extruder or a compression molding machine, thereby obtaining a sheet having a thickness of 0.6 mm. The obtained sheet is coated with a mineral oil. With respect to the resultant sheet, the haze is measured using a hazemeter (COLOR AND COLOR DIFFERENCE METER MODEL 1001DP: manufactured and sold by NIPPON DENSHOKU KOGYO CO., LTD., Japan).

As mentioned above, a shaped article produced from the styrene copolymer composition of the present invention is free from marked occurrence of fish eyes (FE's). The occurrence of FE's can be more effectively suppressed by incorporating 2-(1-(2-hydroxy-3,5-di-t-pentylphenyl)ethyl)-4,6-di-t-pentylphenyl acrylate as a stabilizer into the styrene copolymer composition of the present invention. The amount of the stabilizer is generally from 0.05 to 3 parts by weight, preferably from 0.1 to 2 parts by weight, relative to 100 parts by weight of the total of the styrene/n-butyl acrylate copolymer (I) and the block copolymer (II). When the amount of the stabilizer is less than 0.05 part by weight, it is impossible to satisfactorily suppress the occurrence of FE's. On the other hand, when the stabilizer is added to the styrene copolymer composition in an amount exceeding 3 parts by weight, the effect of suppressing the occurrence of FE's cannot be improved, as compared to the case where the stabilizer is added to the styrene copolymer composition in an amount of from 0.05 to 3 parts by weight.

The styrene copolymer composition of the present invention may further contain at least one phenolic stabilizer in an amount of from 0.05 to 3 parts by weight, relative to 100 parts by weight of the total of the styrene/n-butyl acrylate copolymer (I) and the block copolymer (II). Further, the styrene copolymer composition of the present invention may further contain at least one organic phosphate- or organic phosphite-type stabilizer in an amount of from 0.05 to 3 parts by weight, relative to 100 parts by weight of the total of the styrene/n-butyl acrylate copolymer (I) and the block copolymer (II).

Examples of phenolic stabilizers include n-octadecyl-3-(3,5-di-t-butyl-4-hydroxyphenyl)propionate, 2-t-butyl-6-(3-t-butyl-2-hydroxy-5-methylbenzyl)-4-methylphenyl acrylate, 2,4-bis((octylthio)methyl)-o-cresol, tetrakis (methylene-3-(3,5-di-t-butyl-4-hydroxyphenyl)propionate) methane, 1,3,5-trimethyl-2,4,6-tris(3,5-di-t-butyl-4-hydroxybenzyl)benzene, and 2,4-bis(n-octylthio)-6-(4-hydroxy-3,5-di-t-butylanilino)-1,3,5-triazine.

Examples of organic phosphate- and organic phosphite-type stabilizers include tris(nonylphenyl)-phosphite, 2,2-methylenebis(4,6-di-t-butylphenyl)-octylphosphite, 2-((2,4,8,10-tetrakis(1,1-dimethylethyl)dibenzo(d,f)(1,3,2)-dioxaphosphepin-6-yl)oxy)-N,N-bis(2-((2,4,8,10-tetrakis(1,1-dimethylethyl)dibenzo(d,f)(1,3,2)-dioxaphosphepin-6-yl)oxy)ethyl)ethaneamine, and tris(2,4-di-t-butylphenyl) phosphite.

The styrene copolymer composition of the present invention can be produced by any of conventional methods. Examples of such conventional methods include a melt-kneading method using a mixer generally used in the art, such as an open roll, an intensive mixer, an internal mixer, Ko-kneader, a continuous kneader having a twin-rotor, or an extruder, and a method in which each component is dissolved or dispersed in a solvent, followed by removal of the solvent by heating.

If desired, an additive can be added to the styrene copolymer composition of the present invention. Examples of additives include polymeric additives, such as a vinyl aromatic hydrocarbon/conjugated diene block copolymer elastomer in which the vinyl aromatic hydrocarbon monomer unit content is 50% by weight or less, a rubber-modified styrene copolymer, a non-rubber-modified styrene polymer and polyethylene terephthalate.

Further examples of additives include those which have conventionally been used as additives for plastics. Examples of such additives include inorganic reinforcing agents, such as a glass fiber, glass beads, silica, calcium carbonate and talc; organic reinforcing agents, such as an organic fiber, a coumarone-indene resin; crosslinking agents, such as an organic peroxide and an inorganic peroxide; pigments, such as titanium white, carbon black and iron oxide; dyes; flame retardants; antioxidants; ultraviolet light absorbers; antistatic agents; lubricants; plasticizers; fillers other than mentioned above; and mixtures thereof.

Each of the styrene copolymer composition of the present invention per se and a mixture thereof with a coloring agent can be molded by the same molding method as employed in the molding of an ordinary thermoplastic resin to obtain shaped articles for use in various application fields. For example, the molding can be conducted by injection molding or blow molding to obtain a container for parts of office automation apparatuses, daily commodities, food, miscellaneous goods, parts of light electric appliances and the like. Especially, the styrene copolymer composition of the present invention can be advantageously used for producing a heat shrinkable film, a thin film for use in the production of a laminate film, and a transparent sheet used for producing a blister pack or case for food and parts of light electric appliances.

BEST MODE FOR CARRYING OUT THE INVENTION

Hereinbelow, the present invention will be described in more detail with reference to the following Examples and Comparative Examples, which should not be construed as limiting the scope of the present invention.

Various properties of copolymers used in the following Examples and Comparative Examples were measured as follows.

(1) Melt Viscosity:

The melt viscosity of a copolymer is measured using a capirograph (manufactured and sold by Toyo Seiki Co., Ltd., Japan) under conditions wherein the shear rate (SR) is 61 sec$^{-1}$, the capillary length (L) is 10.0 mm, the capillary diameter (D) is 1.00 mm and the barrel diameter (B) is 9.50 mm. The measurement is conducted while elevating the temperature of the copolymer and at points in time when the temperature reaches 180, 190, 200, 210, 220, 230 and 240° C.

(2) Storage Modulus:

The storage modulus of a copolymer is measured as follows. The copolymer is subjected to compression molding to obtain a test specimen having a thickness of about 3 mm and a width of about 12 mm. The obtained test specimen is fixed to two arms, wherein the distance (span) between the two arms is about 15 mm. Then, the storage modulus of the copolymer is measured with respect to the test specimen using DMA983 (manufactured and sold by DUPONT, U.S.A.) under conditions wherein the frequency is the resonant frequency, the rate of temperature elevation is 2° C./min, and the amplitude is 0.2 mm.

(3) Melt Flow Rate (MFR):

MFR is measured in accordance with JISK-6870 under conditions "G" prescribed therein (temperature: 200° C., load: 5 kg).

(4) Degree of Hydrogenation:

The degree of hydrogenation of a copolymer is measured using a nuclear magnetic resonance (NMR) apparatus (DPX-400, manufactured and sold by BRUCKER, Germany).

(5) Short segment ratio in the vinyl aromatic hydrocarbon monomer unit moiety of the block copolymer (II), i.e., the ratio of vinyl aromatic hydrocarbon monomer units contained in short segment(s) consisting of 1 to 3 vinyl aromatic hydrocarbon monomer units:

An ozone ($O_3$)-containing oxygen gas having an ozone content of 1.5% is introduced into a solution of a block copolymer in dichloromethane at a rate of 150 ml/min to conduct an oxidative degradation of the block copolymer, thereby obtaining an ozonide. The obtained ozonide is dropwise added to a mixture of diethyl ether with lithium aluminum hydride, to thereby effect a reduction of the ozonide. Then, to the resultant is dropwise added pure water to effect hydrolysis of the reduced product, followed by addition of potassium carbonate to salt out a vinyl aromatic hydrocarbon component. The resultant precipitated vinyl aromatic hydrocarbon component is recovered by filtration. The recovered vinyl aromatic hydrocarbon component is subjected to gel permeation chromatography (GPC) to obtain a GPC chromatogram. By calculating the area ratio of the peaks in the obtained GPC chromatogram, the short segment ratio is obtained (see Yasuyuki Tanaka, Hisaya Sato and Yasunobu Nakafutami, "Koubunshi Gakkai Yokoushu (Preprints of Meeting of the Society of Polymer Science)", Vol. 29, p. 2051, 1980, Japan). In the above-mentioned oxidative degradation, as an apparatus for generating ozone, an ozone generating machine (OT-31R-2, manufactured and sold by Nippon Ozone Co., Ltd., Japan) is used. In the GPC, chloroform is used as a solvent. The GPC is conducted using shimpack HSG-40H, shimpack GPC-802 and shimpack GPC-801 (each of which is manufactured and sold by Shimadzu Corporation, Japan) which are connected in series in this order as viewed in the direction of flow of the solvent.

Further, with respect to the sheets or heat shrinkable films obtained in the following Examples and Comparative Examples, the following evaluations were made.

(1) Modulus in Tension (Index for Stiffness) and Elongation at Break:

With respect to a test sample in the form of a sheet (obtained by extruding a copolymer composition) having a width of 12.7 mm, the measurement is conducted at a pulling rate of 5 mm/min with respect to each of an extrusion direction of the sample and a direction perpendicular to the extrusion direction, wherein the distance between the gage marks is 50 mm.

(2) Anisotropy

The anisotropy of a sheet is evaluated, based on the value obtained by dividing the modulus in tension value obtained in item (1) above with respect to an extrusion direction of the sample by the modulus in tension value obtained in item (1) above with respect to a direction perpendicular to the extrusion direction. The criteria for the evaluation are as follows:

○: less than 1.25
X: 1.25 or more (3) Surface Impact Strength (Index for Impact Resistance):

The measurement is conducted at 23° C. in accordance with ASTMD-1709, except that the diameter of the weight is ½ inch, to obtain a 50% breakage value.

(4) Haze:

The surface of a sheet is coated with liquid paraffin and, then, the haze of the sheet is measured in accordance with ASTM D1003.

(5) Vicat Softening Point (Index for Heat Resistance):

7 to 8 sheets having a thickness of 0.6 mm are put one upon another to thereby obtain a laminate, and the obtained laminate is subjected to compression molding to obtain a test specimen having a thickness of 3 mm. With respect to the obtained test specimen, the Vicat softening point is measured in accordance with ASTM D-1525 under a load of 1 kg at a temperature elevation rate of 2° C./min.

(6) 80° C. Shrinkage Factor (Index for Heat Shrinkability at Relatively Low Heating Temperatures):

A 0.25 mm-thick sheet (obtained by extruding a copolymer composition) is uniaxially stretched 5-fold in a direction perpendicular to an extrusion direction of the sheet by the use of a tenter, to thereby obtain a heat shrinkable film having a thickness of about 60 μm. The obtained heat shrinkable film is immersed in hot water having a temperature of 80° C. for 5 minutes. The 80° C. shrinkage factor of the heat shrinkable film is calculated by the following formula:

80° C. shrinkage factor (%)=$\{(L-L_1)/L\} \times 100$ wherein L represents the length of the heat shrinkable film before the immersion thereof in the hot water having a temperature of 80° C., and $L_1$ represents the length of the heat shrinkable film after 5 minutes of the immersion thereof in the hot water.

(7) Natural Shrinkage Factor:

A heat shrinkable film obtained by the same method as in item (6) above (which exhibits an 80° C. shrinkage factor of 40%) is allowed to stand still at 35° C. for days and, then, the "NS value" which is defined by the following formula is obtained:

NS value (%)=$\{(L_2-L_3)/L_2\} \times 100$ wherein $L_2$ and $L_3$ represent the lengths of the film before and after 5 days of the standing at 35° C., respectively.

(8) Resistance to Fusion Bonding in Hot Water:

Heat shrinkable films obtained by the same method as in item (6) above are, respectively, twined around glass bottles, each having a diameter of about 8 cm. Then, the three glass bottles are immersed in hot water having a temperature 85° C. and allowed to stand still in the hot water for 5 minutes, wherein the three glass bottles are placed in the hot water so that the three glass bottles are in contact with each other through the heat shrinkable films. Then, the conditions of the films twined round the glass bottles are visually observed, and the resistance to fusion bonding in hot water is evaluated in accordance with the following criteria:

◎: The films are not fusion bonded to each other at all.
○: The films are fusion bonded to each other so weakly that the films are easily separated from each other.
X: The films are fusion bonded to each other so strongly that films are not easily separated from each other.

(9) Fish Eye (FE) (Small Globular Mass):

Sheets having a thickness of 0.3 mm are continuously produced for 6 hours by using a 40 mm sheet extruder (i.e., extruder for producing sheets, which has a screw having a diameter of 40 mm) (at an extrusion temperature of 235° C.). With respect to each of the sheets produced at points in time of 5 minutes and 6 hours after the start of the continuous molding, the number of FE's having a size of 0.5 mm or more observed per 300 cm$^2$ of the sheet is counted. Based on the difference in the number of FE's between the two sheets, the occurrence of FE's is evaluated as follows:

○: The difference is less than 50.
Δ: The difference is from 50 to 100.
X: The difference is more than 100.

Each of styrene/n-butyl acrylate copolymers A-1 to A-3, which were used in the following Examples and Comparative Examples, was produced as follows.

To a 10-liter autoclave equipped with a stirrer were added styrene and n-butyl acrylate in a weight ratio described in Table 1 (wherein the total amount of the styrene and the n-butyl acrylate was 5 kg) simultaneously with 0.3 kg of ethylbenzene and a predetermined amount of 1,1-bis(t-butylperoxy)cyclohexane (which was used for adjusting the MFR of the styrene/n-butyl acrylate copolymer to be produced). Then, a polymerization reaction was performed at 110 to 150° C. for 2 to 10 hours. From the resultant polymer were removed unreacted monomers (i.e., styrene, n-butyl acrylate and ethylbenzene) using a vented extruder to thereby obtain a styrene/n-butyl acrylate copolymer.

The properties of styrene/n-butyl acrylate copolymers A-1 to A-4 are shown in Table 1.

Block copolymer B-1, which was used in the following Examples and Comparative Examples, was produced as follows.

Into a sealed 30-liter reactor having a jacket was charged a 25% by weight solution of 1,3-butadiene in cyclohexane, which contains 8 parts by weight of 1,3-butadiene. Then, into the reactor was charged 0.055 part by weight of n-butyllithium. The reactor was purged with nitrogen gas. A first polymerization reaction was performed at 80° C. for 15 minutes while maintaining the pressure in the reactor within the range of from 3 to 5 kg/cm$^2$G. Then, a 25% by weight solution of styrene in cyclohexane, which contains 21 parts by weight of styrene, was charged at one time into the reactor to perform a second polymerization reaction at 80° C. for 20 minutes. Then, a 20% by weight solution of 1,3-butadiene in cyclohexane, which contains 4 parts by weight of 1,3-butadiene, was charged at one time into the reactor to perform a third polymerization reaction at 80° C. for 5 minutes. Then, a fourth polymerization reaction is performed at 80° C. while continuously charging over 25 minutes into the reactor a 20% by weight cyclohexane solution of a mixture of 1,3-butadiene and styrene, which contains 18 parts by weight of 1,3-butadiene and 4 parts by weight of styrene. Then, a 20% by weight cyclohexane solution of styrene, which contains 45 parts by weight of styrene, was added at one time into the reactor to perform a fifth polymerization reaction at 80° C. for 35 minutes. Thereafter, methanol was fed to the reactor in a molar amount 0.9 time the molar amount of the n-butyllithium used, and the contents of the reactor were stirred for several minutes (1 to 5 minutes), followed by addition of stabilizers. Then, the cyclohexane solvent was removed from the reactor to obtain block copolymer B-1 in the form of a composition thereof with stabilizers.

Further, block copolymers B-2 to B-14 having configurations shown in Table 2 were produced, wherein polymerization reactions for forming the polymer blocks were performed in substantially the same manner as in the production of blanched block copolymer B-1.

All of the MFR's of block copolymers B-1 to B-14 were measured and found to be in the range of from 5 to 10.

EXAMPLES 1 TO 5 AND COMPARATIVE EXAMPLES 1 TO 6

In each of Examples 1 to 5 and Comparative Examples 1 to 6, a styrene copolymer composition having a composition shown in Table 3 was subjected to extrusion molding at an extrusion temperature of 200° C. using a 40 mm sheet extruder, thereby obtaining a sheet having a thickness of 0.25 mm. The modulus in tension (index for stiffness), elongation at break and haze of the sheet were measured in accordance with the above-mentioned methods. Further, the sheet was stretched to obtain a heat shrinkable film. With respect to the obtained heat shrinkable film, the 80° C. shrinkage factor (index for heat shrinkability at relatively low heating temperature), natural shrinkage factor and resistance to fusion bonding in hot water were measured in accordance with the above-mentioned methods.

Further, a sheet having a thickness of 0.6 mm was produced by substantially the same method as described above, and the surface impact strength (index for impact resistance) was measured in accordance with the above-mentioned method.

In addition, the styrene copolymer composition mentioned above was subjected to continuous extrusion molding at an extrusion temperature of 235° C. using a 40 mm sheet extruder for 6 hours, thereby obtaining sheets having a thickness of 0.3 mm. With respect to the obtained sheets, FE was evaluated in accordance with the above-mentioned method.

EXAMPLES 6 TO 9 AND COMPARATIVE EXAMPLES 7 TO 12

In each of Examples 6 to 9 and Comparative Examples 7 to 12, using a styrene copolymer composition having a composition shown in Table 4, sheets and a heat shrinkable film were produced in substantially the same manner as in Example 1. With respect to the obtained sheets and heat shrinkable film, the modulus in tension (index for stiffness), elongation at break, haze, 80° C. shrinkage factor (index for shrinkability at relatively low heating temperature), natural shrinkage factor, resistance to fusion bonding in hot water and surface impact strength (index for impact resistance) were measured in accordance with the above-mentioned methods. Further, the anisotropy of the sheet was calculated in accordance with the above-mentioned method. The results are shown in Table 4.

EXAMPLE 10

Block copolymer B-1 was subjected to hydrogenation in the presence of a Ti-containing hydrogenation catalyst described in Examined Japanese Patent Application Publication No. 63-5401, to thereby hydrogenate a part of the aliphatic double bonds of the 1,3-butadiene monomer units in block copolymer B-1, thereby obtaining hydrogenated block copolymer C-1. With respect to the obtained copolymer C-1, the degree of hydrogenation of the aliphatic double bonds was 12% by weight.

Using a styrene copolymer composition containing hydrogenated block copolymer C-1 and having a composition shown in Table 5, sheets and a heat shrinkable film were produced in substantially the same manner as in Example 1. With respect to the obtained sheets and heat shrinkable film, various properties were measured and evaluated. The results are shown in Table 5.

EXAMPLE 11

Block copolymer B-2 was subjected to hydrogenation in the presence of a Ti-containing hydrogenation catalyst described in Examined Japanese Patent Application Publication No. 63-5401, to thereby hydrogenate a part of the aliphatic double bonds of the 1,3-butadiene monomer units in block copolymer B-2, thereby obtaining hydrogenated block copolymer C-2. With respect to the obtained copolymer C-3, the degree of hydrogenation of the aliphatic double bonds was 42% by weight.

Using a styrene copolymer composition containing hydrogenated block copolymer C-2 and having a composition shown in Table 5, sheets and a heat shrinkable film were produced in substantially the same manner as in Example 1. With respect to the obtained sheets and heat shrinkable film, various properties were measured and evaluated. The results are shown in Table 5.

EXAMPLE 12

Substantially the same procedure as in the production of block copolymer B-1 was repeated, except that, immediately before the introduction of methanol, epoxidized soybean oil as a terminal modifier was charged into the reactor to modify living terminals of block copolymer chains being formed, to thereby obtain block copolymer D-1 having bonded to the terminals thereof residues of the terminal modifier. The terminal modifier was used in an equimolar amount to the lithium atom in the n-butyllithium used as the polymerization initiator.

Using a styrene copolymer composition containing the obtained block copolymer D-1 and having a composition shown in Table 5, sheets and a heat shrinkable film were produced in substantially the same manner as in Example 1. With respect to the obtained sheets and heat shrinkable film, various properties were measured and evaluated. The results are shown in Table 5.

EXAMPLE 13

Substantially the same procedure as in the production of block copolymer B-3 was repeated, except that, immediately before the introduction of methanol, tetraglycidyl-1,3-bisaminomethylclohexane as a terminal modifier was charged into the reactor to modify living terminals of block copolymer chains being formed, to thereby obtain block copolymer D-3 having bonded to the terminals thereof residues of the terminal modifier. The terminal modifier was used in an equimolar amount to the lithium atom in the n-butyllithium used as the polymerization initiator.

Using a styrene copolymer composition containing the obtained block copolymer D-3 and having a composition shown in Table 5, sheets and a heat shrinkable film were produced in substantially the same manner as in Example 1. With respect to the obtained sheets and heat shrinkable film, various properties were measured and evaluated. The results are shown in Table 5.

EXAMPLE 14

Block copolymer B-6 was subjected to hydrogenation in the presence of a Ti-containing hydrogenation catalyst described in Examined Japanese Patent Application Publication No. 63-5401, to thereby hydrogenate a part of the aliphatic double bonds of the 1,3-butadiene monomer units in block copolymer B-6, thereby obtaining hydrogenated block copolymer C-6. With respect to the obtained copolymer C-6, the degree of hydrogenation of the aliphatic double bonds was 10% by weight.

Using a styrene copolymer composition containing hydrogenated block copolymer C-6 and having a composition shown in Table 6, sheets and a heat shrinkable film were produced in substantially the same manner as in Example 1. With respect to the obtained sheets and heat shrinkable film, various properties were measured and evaluated. The results are shown in Table 6.

EXAMPLE 15

Block copolymer B-7 was subjected to hydrogenation in the presence of a Ti-containing hydrogenation catalyst described in Examined Japanese Patent Application Publication No. 63-5401, to thereby hydrogenate a part of the aliphatic double bonds of the 1,3-butadiene monomer units in block copolymer B-7, thereby obtaining hydrogenated block copolymer C-7. With respect to the obtained copolymer C-7, the degree of hydrogenation of the aliphatic double bonds was 44% by weight.

Using a styrene polymer composition containing the hydrogenated block copolymer C-7 and having a composition shown in Table 6, sheets and a heat shrinkable film were produced in substantially the same manner as in Example 1. With respect to the obtained sheets and heat shrinkable film, various properties were measured and evaluated. The results are shown in Table 6.

EXAMPLE 16

Substantially the same procedure as in the production of block copolymer B-8 was repeated, except that, immediately before the introduction of methanol, epoxidized soybean oil as a terminal modifier was charged into the reactor to modify living terminals of block copolymer chains being formed, to thereby obtain block copolymer D-8 having bonded to the terminals thereof residues of the terminal modifier. The terminal modifier was used in an equimolar amount to the lithium atom in the n-butyllithium used as the polymerization initiator.

Using a styrene copolymer composition containing the obtained block copolymer D-8 and having a composition shown in Table 6, sheets and a heat shrinkable film were produced in substantially the same manner as in Example 1. With respect to the obtained sheets and heat shrinkable film, various properties were measured and evaluated. Further, the anisotropy of the sheet was calculated in accordance with the above-mentioned method. The results are shown in Table 6.

EXAMPLE 17

Substantially the same procedure as in the production of block copolymer B-6 was repeated, except that, immediately before the introduction of methanol, tetraglycidyl-1,3-bisaminomethylclohexane as a terminal modifier was charged into the reactor to modify living terminals of block copolymer chains being formed, to thereby obtain block copolymer D-6 having bonded to the terminals thereof residues of the terminal modifier. The terminal modifier was used in an equimolar amount to the lithium atom in the n-butyllithium used as the polymerization initiator.

Using a styrene copolymer composition containing the obtained block copolymer D-6 and having a composition shown in Table 6, sheets and a heat shrinkable film were produced in substantially the same manner as in Example 1. With respect to the obtained sheets and heat shrinkable film, various properties were measured and evaluated. Further, the anisotropy of the sheet was calculated in accordance with the above-mentioned method. The results are shown in Table 6.

TABLE 1

|  | A-1 | A-2 | A-3 | A-4 | A-5 |
| --- | --- | --- | --- | --- | --- |
| Styrene content (% by weight) | 88 | 83 | 78 | 90 | 96 |
| Storage modulus at 30° C. (Pa) | $1.85 \times 10^9$ | $1.80 \times 10^9$ | $1.70 \times 10^9$ | $1.88 \times 10^9$ | $1.91 \times 10^9$ |
| Temperature at which the storage modulus is 50 % of the storage modulus at 30° C. (° C.) | 82 | 76 | 70 | 86 | 91 |
| MFR (g/10 min) | 3.5 | 4.0 | 4.8 | 2.8 | 2.1 |
| Melt viscosity (poise) | | | | | |
| 180° C. | 28,000 | 18,500 | 16,800 | 32,000 | 36,000 |
| 190° C. | 24,500 | 15,600 | 13,800 | 27,500 | 30,100 |
| 200° C. | 20,200 | 12,800 | 12,000 | 22,500 | 25,100 |
| 210° C. | 17,700 | 11,100 | 10,200 | 19,500 | 22,200 |
| 220° C. | 15,500 | 10,100 | 8,400 | 17,200 | 20,200 |
| 230° C. | 14,700 | 9,300 | 7,500 | 16,500 | 19,100 |
| 240° C. | 14,200 | 9,000 | 7,120 | 16,100 | 18,700 |

TABLE 2

| | Styrene content (% by weight) | Short segment ratio (% by weight) | Maximum block/minimum block weight ratio *3 | Peak molecular weight of styrene polymer *2 | Block configuration *1 |
|---|---|---|---|---|---|
| B-1 | 70 | 2.9 | 2.14 | 74,000 | $B_1(8)$-$S_1(21)$-$B_2(4)$-B/S(18/4)-$S_2(45)$ |
| B-2 | 82 | 8.0 | 1.23 | 43,000 | $S_1(38)$-B/S(18/13)-$S_2(31)$ |
| B-3 | 76 | 16.7 | 1.23 | 41,000 | $S_1(32)$-I(8)-I/B/S(5/11/18)-$S_2(26)$ |
| B-4 | 68 | 9.1 | 2.93 | 128,000 | $S_1(15)$-B(12)-I/B/S(7/13/9)-$S_2(44)$ |
| B-5 | 73 | 10.8 | 3.00 | 37,000 | $[S_1(45)$-I/B/S(9/15/13)-$S_2(15)$-$B(3)]_4X$ |
| B-6 | 77 | 12.7 | 1.03 | 42,000 | $S_1(30)$-I/B/S(8/15/18)-$S_2(29)$ |
| B-7 | 80 | 10.6 | 1.10 | 46,000 | $S_1(33)$-B(7)-B/S(13/17)$S_2(30)$ |
| B-8 | 83 | 15.7 | 1.11 | 47,000 | $S_1(30)$-I/B/S(6/11/26)-$S_2(27)$ |
| B-9 | 75 | 14.2 | 1.07 | 30,000 | $[S_1(31)$-I/B/S(7/15/15)-$S_2(29)$-$B(3)]_4X$ |
| B-10 | 63 | 0.9 | 5.10 | 83,000 | B(15)-$S_1(10)$-I/B/S(2/20/2)-$S_2(51)$ |
| B-11 | 91 | 7.7 | 1.03 | 56,000 | $S_1(40)$-I/B/S(2/7/12)-$S_2(39)$ |
| B-12 | 72 | 0.5 | 5.00 | 62,000 | $[S_1(60)$-$B_1(26)$-$S_2(12)$-$B_2(2)]_4Y$ |
| B-13 | 67 | 24.8 | 1.27 | 26,000 | $S_1(15)$-B/S(33/33)-$S_2(19)$ |
| B-14 | 75 | 9.1 | 2.00 | 160,000 | $S_1(20)$-$B_1(8)$-B/S(9/15)-$B_2(8)$-$S_2(40)$ |

Note:
*1: In each of the block configurations, each "I" represents a isoprene polymer block; each "B" represents a butadiene polymer block; each "I/B" represents a isoprene/1,3-butadiene copolymer polymer block; each "I/B/S" represents an isoprene/1,3-butadiene/styrene copolymer block; each "S" represents a styrene polymer block; each "X" represents a residue of tetraglycidyl-1,3-bisaminomethylcyclohexane; "Y" represents a residue of silicon tetrachloride; and each figure in the parenthesis represents the amount (weight percentage) of the polymer block. In the production of each of B-4 and B-14, the molecular weight of styrene polymer $S_2$ was controlled by a method in which, after 5 parts by weight of the styrene monomer for forming $S_2$ block is added to the polymerization reaction system, ethyl alcohol is added to the polymerization reaction system in a molar amount less than the molar amount of the living terminals of polymer, followed by addition of the remainder of the styrene monomers for forming $S_2$ block to resume the polymerization reaction.
*2: With respect to each of block copolymers B-6, B-7, B-8, B-9 and B-11, the described value represents a peak molecular weight of the styrene polymer blocks in a gel permeation chromatogram thereof (each of the above block copolymers has a single peak molecular weight). On the other hand, with respect to each of block copolymers B-1, B-2, B-3, B-4, B-5, B-10, B-12, B-13 and B-14, the described value represents a peak molecular weight of a polymer block having a maximum peak molecular weight, i.e., a peak molecular weight of an S block having the largest weight percentage of the S blocks.
*3: This means a weight ratio of a maximum weight polymer block to a minimum weight polymer block, wherein the maximum weight and minimum weight polymer blocks are contained in the block copolymer.

TABLE 3

| | | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|
| Composition | | | | | | | | | | | | |
| Type and amount of the styrene/n-butyl acrylate copolymer (% by weight) *1 | | A-2 50 | A-2 30 | A-1 50 | A-2 65 | A-1 50 | A-2 50 | A-2 95 | A-3 60 | A-4 45 | A-5 50 | A-2 50 |
| Type and amount of the block copolymer (% by weight) *1 | | B-1 50 | B-2 70 | B-3 50 | B-4 35 | B-5 50 | B-13 50 | B-11 5 | B-1 40 | B-10 55 | B-1 50 | B-14 50 |
| Stabilizer | Stabilizer a (part by weight) *2 | 0.5 | 0.4 | 1.0 | 0.3 | 0.3 | — | 0.2 | — | 0.1 | 0.2 | — |
| | Stabilizer b (part by weight) *2 | 0.3 | 0.2 | 0.5 | 0.2 | 0.2 | 0.6 | 0.2 | 0.2 | — | 0.3 | 0.2 |
| | Stabilizer c (part by weight) *2 | 0.3 | — | 0.3 | — | 0.1 | 0.2 | 0.1 | 0.3 | 0.1 | 0.2 | 0.2 |
| Properties of sheets and a heat shrinkable film | | | | | | | | | | | | |
| Modulus in tension (kgf/cm$^2$) | Extrusion Direction | 12,600 | 14,100 | 13,100 | 14,200 | 13,400 | 8,700 | 21,700 | 13,200 | 10,800 | 14,400 | 14,100 |
| | Direction perpendicular to the extrusion direction | 10,800 | 13,000 | 11,400 | 13,100 | 12,600 | 5,200 | 20,800 | 11,100 | 7,600 | 12,800 | 12,500 |

TABLE 3-continued

|  |  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|
| Elongation at break (%) | Extrusion Direction | 75 | 45 | 75 | 55 | 50 | 150 or more | 4 | 60 | 150 or more | 55 | 60 |
|  | Direction perpendicular to the extrusion direction | 130 | 65 | 100 | 70 | 100 | 150 or more | 4 | 90 | 150 or more | 90 | 85 |
| Surface impact strength (kg · cm) |  | 90 | 60 | 85 | 65 | 55 | 200 or more | 3 or less | 70 | 200 or more | 40 | 70 |
| Haze (%) |  | 0.7 | 0.6 | 0.8 | 0.9 | 0.9 | 1.3 | 0.4 | 1.6 | 2.9 | 2.8 | 0.8 |
| Shrinkage factor at 80° C. (%) |  | 63 | 64 | 65 | 58 | 60 | 65 | 62 | 68 | 39 | 12 | 47 |
| Natural shrinkage factor (%) |  | 0.4 | 0.3 | 0.3 | 0.7 | 0.5 | 1.1 | 0.3 | 0.3 | 2.2 | 14.5 | 1.8 |
| Resistance to fusion bonding in hot water |  | ⊚ | ⊚ | ⊚ | ○ | ⊚ | X | ⊚ | X | ○ | ⊚ | ⊚ |
| FE |  | ○ | ○ | ○ | ○ | ○ | X | ○ | X | X | ○ | X |

(Notes)
Stabilizer a: 2-(1-(2-hydroxy-3,5-di-t-pentylphenyl)ethyl)-4,6-di-t-pentylphenyl acrylate
Stabilizer b: n-octadecyl-3-(3,5-di-t-butyl-4-hydroxyphenyl)propionate
Stabilizer c: tris(nonylphenyl)phosphite
*1: Each of the amounts of the styrene/n-butyl acrylate copolymer and the block copolymer is indicated in terms of % by weight, based on the total weight of the styrene/n-butyl acrylate copolymer and the block copolymer.
*2: The amounts of the stabilizers are indicated in terms of parts by weight, relative to 100 parts by weight of the total of the styrene/n-butyl acrylate copolymer and the block copolymer.

TABLE 4

|  |  | Ex. 6 | Ex. 7 | Ex. 8 | Ex. 9 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|---|
| Composition |  |  |  |  |  |  |  |  |  |  |  |
| Type and amount of the styrene/n-butyl acrylate copolymer (% by weight) *1 |  | A-1 30 | A-1 25 | A-1 20 | A-2 50 | A-1 50 | A-2 30 | A-4 60 | A-3 40 | A-2 15 | A-5 45 |
| Type and amount of the block copolymer (% by weight) *1 |  | B-6 70 | B-7 75 | B-8 80 | B-9 40 | B-11 50 | B-12 70 | B-14 40 | B-10 60 | B-6 85 | B-6 55 |
| Tufprene 125 (% by weight) *1 |  | — | — | — | 10 | — | — | — | — | — | — |
| Stabilizer | Stabilizer a (part by weight) *2 | 0.4 | 0.2 | 2.0 | 0.4 | 0.5 | — | 0.1 | — | — | — |
|  | Stabilizer b (part by weight) *2 | 0.2 | — | — | 0.3 | 0.3 | 0.3 | 0.1 | 0.2 | 0.2 | 0.5 |
|  | Stabilizer c (part by weight) *2 | 0.1 | 0.2 | 0.5 | — | 0.1 | 0.3 | — | 0.1 | 0.1 | — |
| Properties of sheets and a heat shrinkable film |  |  |  |  |  |  |  |  |  |  |  |
| Modulus in tension (kgf/cm²) | Extrusion direction | 13,500 | 14,100 | 14,100 | 14,200 | 18,700 | 14,200 | 16,300 | 9,700 | 12,100 | 14,300 |
|  | Direction perpendicular to the extrusion direction | 13,000 | 13,800 | 13,800 | 13,900 | 18,400 | 10,500 | 12,600 | 6,800 | 11,300 | 13,700 |
| Elongation at break (%) | Extrusion direction | 65 | 45 | 40 | 75 | 7 | 80 | 50 | 150 or more | 130 | 40 |
|  | Direction perpendicular to the extrusion direction | 80 | 55 | 45 | 85 | 8 | 95 | 85 | 150 or more | 155 | 50 |
| Anisotropy of the sheet |  | ○ | ○ | ○ | ○ | ○ | X | X | X | ○ | ○ |
| Surface impact strength (kg · cm) |  | 90 | 60 | 55 | 85 | 4 | 100 | 40 | 200 or more | 130 | 45 |
| Haze (%) |  | 0.7 | 0.7 | 0.6 | 1.0 | 0.6 | 0.6 | 1.7 | 3.2 | 0.3 | 1.6 |
| Shrinkage factor at 80° C. (%) |  | 56 | 53 | 54 | 50 | 62 | 50 | 37 | 33 | 50 | 21 |
| Natural shrinkable factor (%) |  | 0.7 | 0.7 | 0.6 | 0.9 | 0.3 | 0.9 | 3.1 | 7.6 | 1.4 | 10.6 |

TABLE 4-continued

|  | Ex. 6 | Ex. 7 | Ex. 8 | Ex. 9 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|
| Resistance to fusion bonding in hot water | ◎ | ◎ | ○ | ○ | ○ | ◎ | ◎ | ○ | ○ | ◎ |
| FE | ○ | ○ | ○ | ○ | ○ | X | X | X | X | X |

(Notes)
Stabilizer a: 2-(1-(2-hydroxy-3,5-di-t-pentylphenyl)ethyl)-4,6-di-t-pentylphenyl acrylate
Stabilizer b: n-octadecyl-3-(3,5-di-t-butyl-4-hydroxyphenyl)propionate
Stabilizer c: tris(nonylphenyl)phosphite
*1: Each of the amounts of the styrene/n-butyl acrylate copolymer and the block copolymer is indicated in terms of % by weight, based on the total weight of the styrene/n-butyl acrycalate copolymer and the block copolymer. However, in Example 9, each of the amounts of the styrene/n-butyl acrylate copolymer and the block copolymer is indicated in terms of % by weight, based on the total weight of the styrene/n-butyl acrylate copolymer, the block copolymer the amount of the styrene/n-butyl acrylate copolymer, the block copolymer the amount of the styrene/n-butyl acrylate copolymer, the block copolymer and Tufprene 125 (manufactured and sold by ASAHI CHEMICAL INDUSTRY CO., LTD.: styrene content of 40% by weight).
*2: The amounts of the stabilizers are indicated in terms of parts by weight, relative to 100 parts by weight of the total of the styrene/n-butyl acrylate copolymer and the block copolymer.

TABLE 5

|  |  | Ex. 10 | Ex. 11 | Ex. 12 | Ex. 13 |
|---|---|---|---|---|---|
| Composition |  |  |  |  |  |
| Type and amount of the styrene/n-butyl acrylate copolymer (% by weight) *1 |  | A-2<br>50 | A-2<br>25 | A-2<br>45 | A-2<br>50 |
| Type and amount of the block copolymer (% by weight) *1 |  | C-1<br>50 | C-2<br>75 | D-1<br>55 | D-3<br>50 |
| Stabilizer | Stabilizer a (part by weight) *2 | 0.2 | 0.1 | 0.5 | 0.3 |
|  | Stabilizer b (part by weight) *2 | 0.2 | 0.1 | 0.3 | 0.2 |
|  | Stabilizer c (part by weight) *2 | 0.1 | — | 0.3 | 0.2 |
| Properties of the sheet and heat shrinkable film |  |  |  |  |  |
| Modulus in tension (kgf/cm²) | Extrusion Direction | 13,100 | 14,400 | 12,700 | 13,200 |
|  | Direction perpendicular to the extrusion direction | 11,200 | 13,200 | 11,000 | 11,600 |
| Elongation at break (%) | Extrusion Direction | 70 | 40 | 85 | 55 |
|  | Direction perpendicular to the extrusion direction | 120 | 65 | 110 | 70 |
| Surface impact strength (kg · cm) |  | 90 | 65 | 95 | 60 |
| Haze (%) |  | 0.6 | 0.7 | 0.7 | 0.8 |
| Shrinkage factor at 80° C. (%) |  | 61 | 59 | 66 | 60 |
| Natural shrinkage factor (%) |  | 0.4 | 0.5 | 0.3 | 0.6 |
| Resistance to fusion bonding in hot water |  | ◎ | ◎ | ◎ | ○ |
| FE |  | ○ | ○ | ○ | ○ |

(Notes)
Stabilizer a: 2-(1-(2-hydroxy-3,5-di-t-pentylphenyl)ethyl)-4,6-di-t-pentylphenyl acrylate
Stabilizer b: n-octadecyl-3-(3,5-di-t-butyl-4-hydroxyphenyl)propionate
Stabilizer c: tris(nonylphenyl)phosphite
*1: Each of the amounts of the styrene/n-butyl acrylate copolymer and the block copolymer is indicated in terms of % by weight, based on the total weight of the styrene/n-butyl acrylate copolymer and the block copolymer.
*2: The amounts of the stabilizers are indicated in terms of parts by weight, relative to 100 parts by weight of the total of the styrene/n-butyl acrylate copolymer and the block copolymer.

TABLE 6

|  |  | Ex. 14 | Ex. 15 | Ex. 16 | Ex. 17 |
|---|---|---|---|---|---|
| Composition |  |  |  |  |  |
| Type and amount of the styrene/n-butyl acrylate copolymer (% by weight) *1 |  | A-1<br>30 | A-2<br>25 | A-1<br>20 | A-1<br>35 |
| Type and amount of the block copolymer (% by weight) *1 |  | C-6<br>70 | C-7<br>75 | D-8<br>80 | D-6<br>65 |
| Stabilizer | Stabilizer a (part by weight) *2 | 0.2 | 0.1 | 0.1 | 0.3 |
|  | Stabilizer b (part by weight) *2 | 0.2 | 0.1 | 0.3 | 0.2 |
|  | Stabilizer c (part by weight) *2 | 0.1 | — | 0.2 | 0.2 |
| Properties of sheets and heat shrinkable film |  |  |  |  |  |
| Modulus in tension (kgf/cm²) | Extrusion Direction | 13,700 | 14,000 | 13,800 | 14,000 |
|  | Direction perpendicular to extrusion direction | 13,100 | 13,100 | 13,400 | 13,400 |
| Elongation at break (%) | Extrusion Direction | 65 | 45 | 90 | 50 |
|  | Direction perpendicular to the extrusion direction | 110 | 70 | 105 | 65 |
| Anisotropy of the sheet |  | ○ | ○ | ○ | ○ |
| Surface impact strength (kg · cm) |  | 90 | 70 | 100 | 55 |
| Haze(%) |  | 0.7 | 0.6 | 0.7 | 0.8 |
| Shrinkage factor at 80° C.(%) |  | 60 | 58 | 64 | 62 |
| Natural shrinkage factor (%) |  | 0.4 | 0.5 | 0.4 | 0.5 |
| Resistance to fusion bonding in hot water |  | ◎ | ◎ | ◎ | ◎ |
| FE |  | ○ | ○ | ○ | ○ |

(Notes)
Stabilizer a: 2-(1-(2-hydroxy-3,5-di-t-pentylphenyl)ethyl)-4,6-di-t-pentylphenyl acrylate
Stabilizer b: n-octadecyl-3-(3,5-di-t-butyl-4-hydroxyphenyl)propionate
Stabilizer c: tris(nonylphenyl)phosphite
*1: The amounts of the styrene/n-butyl acrylate copolymer and the block copolymer are indicated in terms of % by weight, based on the total weight of the styrene/n-butyl acrylate copolymer and the block copolymer.
*2: The amounts of the stabilizers are indicated in terms of parts by weight, relative to 100 parts by weight of the total of the styrene/n-butyl acrylate copolymer and the block copolymer.

INDUSTRIAL APPLICABILITY

A shaped article obtained from the styrene copolymer composition of the present invention not only exhibits high modulus in tension, high elongation at break, excellent transparency, low natural shrinkage factor and high resistance to fusion bonding in hot water, but also is free from marked occurrence of fish eyes. Further, a shaped article obtained from the composition of the first aspect of the present invention (which composition contains an asymmetric block copolymer as the block copolymer (II)) exhibits excellent surface impact strength (the anisotropy of such a shaped article is slightly large); and a shaped article obtained from the composition of the second aspect of the present invention (which composition contains a symmetric block copolymer as the block copolymer (II)) exhibits advantageously low anisotropy. In addition, a heat shrinkable film obtained from the composition the present invention not only is free from marked occurrence of fish eyes, but also exhibits excellent heat shrinkability at relatively low heating temperatures. Therefore, the composition of the present invention can be advantageously used for producing various shaped articles, such as a wrapping film and a film to be laminated on a foam container.

The invention claimed is:

1. A styrene copolymer composition comprising:
(I) a styrene/n-butyl acrylate copolymer comprising 80 to 89% by weight of styrene monomer units and 20 to 11% by weight of n-butyl acrylate monomer units; and
(II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block,
said block copolymer (II) comprising 65 to 90% by weight of vinyl aromatic hydrocarbon monomer units and 35 to 10% by weight of conjugated diene monomer units,
wherein the vinyl aromatic hydrocarbon monomer unit moiety of said block copolymer (II) has a short segment ratio of from 1 to 25% by weight, wherein said short segment ratio is defined as the weight percentage, based on the total weight of vinyl aromatic hydrocarbon monomer units contained in said block copolymer (II), of the vinyl aromatic hydrocarbon monomer units contained in at least one short segment consisting of 1 to 3 vinyl aromatic hydrocarbon monomer units,
wherein said at least two polymer blocks (A) contain a maximum peak molecular weight polymer block exhibiting a maximum peak molecular weight in a gel permeation chromatogram of said at least two polymer blocks (A) and having at least one peak molecular weight in the range of from 30,000 to 150,000, and the content of said maximum peak molecular weight polymer block in said block copolymer (II) is from 20 to 50% by weight,
wherein said at least two polymer blocks (A) have a maximum weight polymer block and a minimum weight polymer block, wherein the weight ratio of said maximum weight polymer block to said minimum weight polymer block is from 1.2 to 4.5, and
wherein the weight ratio of said styrene/n-butyl acrylate copolymer (I) to said block copolymer (II) is from 10/90 to 90/10.

2. The styrene copolymer composition according to claim 1, wherein said styrene/n-butyl acrylate copolymer (I) comprises 83 to 89% by weight of styrene monomer units and 17 to 11% by weight of n-butyl acrylate monomer units.

3. The styrene copolymer composition according to claim 1 or 2, which provides a shaped article having a haze of 1.2% or less.

4. The styrene copolymer composition according to claim 1 or 2, wherein said styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq P(T) \leq 2.91 \times 10^5 - 2350 \times T + 5 \times T^2$$

wherein T represents the measuring temperature (° C.) for the melt viscosity and P(T) represents the melt viscosity (poises) of said copolymer (I) as measured at temperature T (° C.),
wherein said melt viscosity P(T) is measured using a capirograph under conditions wherein the shear rate is 61 sec$^{-1}$, the capillary length is 10.0 mm, the capillary diameter is 1.00 mm and the barrel diameter is 9.50 mm.

5. The styrene copolymer composition according to claim 1 or 2, wherein said styrene/n-butyl acrylate copolymer (I) exhibits a storage modulus in the range of from $1.5 \times 10^9$ to $2.5 \times 10^9$ Pa as measured at 30° C., and wherein the temperature at which said copolymer (I) exhibits a 50% storage modulus relative to the storage modulus at 30° C. is in the range of from 75 to 100° C.

6. The styrene copolymer composition according to claim 1 or 2, which further comprises, as a stabilizer, 0.05 to 3 parts by weight of 2-(1-(2-hydroxy-3,5-di-t-pentylphenyl) ethyl)-4,6-di-t-pentylphenyl acrylate, relative to 100 parts by weight of the total of said styrene/n-butyl acrylate copolymer (I) and said block copolymer (II).

7. The styrene copolymer composition according to claim 1 or 2, wherein the or each vinyl aromatic hydrocarbon/conjugated diene copolymer block (B) in said block copolymer (II) is a vinyl aromatic hydrocarbon/isoprene/1,3-butadiene copolymer block, and wherein said conjugated diene monomer units in said block copolymer (II) comprise isoprene monomer units and 1,3-butadiene monomer units, wherein the weight ratio of the isoprene monomer units to the 1,3-butadiene monomer units is in the range of from 7/25 to 13/11.

8. A block copolymer having a block configuration comprising (A) at least two polymer blocks each comprised mainly of vinyl aromatic hydrocarbon monomer units and (B) at least one vinyl aromatic hydrocarbon/isoprene/1,3-butadiene copolymer block having an isoprene monomer unit/1,3-butadiene monomer unit weight ratio in the range of from 5/11 to 3/5,
said block copolymer comprising 65 to 90% by weight of vinyl aromatic hydrocarbon monomer units and 35 to 10% by weight of conjugated diene monomer units comprising isoprene monomer units and 1,3-butadiene monomer units, said block copolymer having an isoprene monomer unit/1,3-butadiene monomer unit weight ratio in the range of from 7/25 to 13/11,
wherein the vinyl aromatic hydrocarbon monomer unit moiety of said block copolymer has a short segment ratio of from 1 to 25% by weight, wherein said short segment ratio is defined as the weight percentage, based on the total weight of vinyl aromatic hydrocarbon monomer units contained in said block copolymer, of the vinyl aromatic hydrocarbon monomer units contained in at least one short segment consisting of 1 to 3 vinyl aromatic hydrocarbon monomer units,
wherein said at least two polymer blocks (A) contain a maximum peak molecular weight polymer block exhibiting a maximum peak molecular weight in a gel permeation chromatogram of said at least two polymer blocks (A) and having at least one peak molecular weight in the range of from 30,000 to 150,000, and the content of said maximum peak molecular weight polymer block in said block copolymer is from 20 to 50% by weight, and wherein said at least two polymer blocks (A) have a maximum weight polymer block and a minimum weight polymer block, wherein the weight ratio of said maximum weight polymer block to said minimum weight polymer block is from 1.2 to 4.5.

9. A styrene copolymer composition comprising:

(I) a styrene/n-butyl acrylate copolymer comprising 80 to 89% by weight of styrene monomer units and 20 to 11% by weight of nbutyl acrylate monomer units; and (II) a block copolymer having a block configuration comprising (A) at least two polymer blocks each comprised mainly of vinyl aromatic hydrocarbon monomer units and (B) at least one vinyl aromatic hydrocarbon/conjugated diene copolymer block, said block copolymer (II) comprising 75 to 85% by weight of vinyl aromatic hydrocarbon monomer units and 25 to 15% by weight of conjugated diene monomer units, wherein the vinyl aromatic hydrocarbon monomer unit moiety of said block copolymer (II) has a short segment ratio of from 10 to 20% by weight, wherein said short segment ratio is defined as the weight percentage, based on the total weight of vinyl aromatic hydrocarbon monomer units contained in said block copolymer (II), of the vinyl aromatic hydrocarbon monomer units contained in at least one short segment consisting of 1 to 3 vinyl aromatic hydrocarbon monomer units, wherein said at least two polymer blocks (A) contain a peak molecular weight-having polymer block exhibiting, in a gel permeation chromatogram of said at least two polymer blocks (A), at least one peak molecular weight in the range of from 20,000 to 70,000, and the content of said peak molecular weight-having polymer block in said block copolymer (II) is from 25 to 35% by weight, wherein said at least two polymer blocks (A) have a maximum weight polymer block and a minimum weight polymer block, wherein the weight ratio of said maximum weight polymer block to said minimum weight polymer block is from 1.0 to less than 1.2, and wherein the weight ratio of said styrene/n-butyl acrylate copolymer (I) to said block copolymer (II) is from 20/80 to 60/40.

10. The styrene copolymer composition according to claim 9, wherein said styrene/n-butyl acrylate copolymer comprising 83 to 89% by weight of styrene monomer units and 17 to 11% by weight of n-butyl acrylate monomer units.

11. The styrene copolymer composition according to claim 9 or 10, which provides a shaped article having a haze of 1.2% or less.

12. The styrene copolymer composition according to any one of claims 9 or 10, wherein said styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq P(T) \leq 2.91 \times 10^5 - 2350 \times T + 5 \times T^2$$

wherein T represents the measuring temperature (° C.) for the melt viscosity and P(T) represents the melt viscosity (poises) of said copolymer (I) as measured at temperature T (° C.), wherein said melt viscosity P(T) is measured using a capirograph under conditions wherein the shear rate is 61 sec$^{-1}$, the capillary length is 10.0 mm, the capillary diameter is 1.00 mm and the barrel diameter is 9.50 mm.

13. The styrene copolymer composition according to claim 9 or 10, wherein said styrene/n-butyl acrylate copolymer (I) exhibits a storage modulus in the range of from $1.5 \times 10^9$ to $2.5 \times 10^9$ Pa as measured at 30° C., and wherein the temperature at which said copolymer (I) exhibits a 50% storage modulus relative to the storage modulus at 30° C. is in the range of from 75 to 100° C.

14. The styrene copolymer composition according to claim 9 or 10, which further comprises, as a stabilizer, 0.05 to 3 parts by weight of 2-(1-(2-hydroxy-3,5-di-t-pentylphenyl)ethyl)-4,6-di-t-pentylphenyl acrylate, relative to 100 parts by weight of the total of said styrene/n-butyl acrylate copolymer (I) and said block copolymer (II).

15. The styrene copolymer composition according to claim 9 or 10, wherein the or each vinyl aromatic hydrocarbon/conjugated diene copolymer block (B) in said block copolymer (II) is a vinyl aromatic hydrocarbon/isoprene/1,3-butadiene copolymer block, and wherein said conjugated diene monomer units in said block copolymer (II) comprise isoprene monomer units and 1,3-butadiene monomer units, wherein the weight ratio of the isoprene monomer units to the 1,3-butadiene monomer units is in the range of from 7/18 to 6/11.

16. A block copolymer having a block configuration comprising (A) at least two polymer blocks each comprised mainly of vinyl aromatic hydrocarbon monomer units and (B) at least one vinyl aromatic hydrocarbon/isoprene/1,3-butadiene copolymer block, said block copolymer comprising 75 to 85% by weight of vinyl aromatic hydrocarbon monomer units and 25 to 15% by weight of conjugated diene monomer units comprising isoprene monomer units and 1,3-butadiene monomer units, said block copolyrner having an isoprene monomer unit/1,3-butadiene monomer unit weight ratio in the range of from 7/18 to 6/11, wherein the vinyl aromatic hydrocarbon monomer unit moiety of said block copolymer has a short segment ratio of from 10 to 20% by weight, wherein said short segment ratio is defined as the weight percentage, based on the total weight of vinyl aromatic hydrocarbon monomer units contained in said block copolymer, of the vinyl aromatic hydrocarbon monomer units contained in at least one short segment consisting of 1 to 3 vinyl aromatic hydrocarbon monomer units, wherein said at least two polymer blocks (A) contain a peak molecular weight-having polymer block exhibiting, in a gel permeation chromatogram of said at least two polymer blocks (A), at least one peak molecular weight in the range of from 20,000 to 70,000, and the content of said peak molecular weight-having polymer block in said block copolymer is from 25 to 35% by weight, and wherein said at least two polymer blocks (A) have a maximum weight polymer block and a minimum weight polymer block, wherein the weight ratio of said maximum weight polymer block to said minimum weight polymer block is from 1.0 to less than 1.2.

* * * * *